US006486997B1

(12) United States Patent
Bruzzone et al.

(10) Patent No.: US 6,486,997 B1
(45) Date of Patent: Nov. 26, 2002

(54) REFLECTIVE LCD PROJECTION SYSTEM USING WIDE-ANGLE CARTESIAN POLARIZING BEAM SPLITTER

(75) Inventors: Charles L. Bruzzone, Woodbury, MN (US); David J. W. Aastuen, Farmington, MN (US); Roger J. Strharsky, Woodbury, MN (US); Stephen K. Eckhardt, Austin, TX (US); Michael F. Weber, Shoreview, MN (US); Gary T. Boyd, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/312,917

(22) Filed: May 17, 1999

Related U.S. Application Data

(63) Continuation-in-part of application No. 08/958,329, filed on Oct. 28, 1997, now Pat. No. 5,965,247, and a continuation-in-part of application No. 09/126,917, filed on Jul. 31, 1998, now abandoned.

(51) Int. Cl.[7] .......................... G02F 1/03; G02F 1/1335; G02B 5/30
(52) U.S. Cl. .................. 359/247; 359/250; 359/253; 359/256; 359/495; 359/497; 359/500; 349/9; 353/20; 353/81
(58) Field of Search .................... 359/247, 250, 359/252, 253, 256, 486, 487, 495, 497, 498, 500; 349/5, 9; 353/20, 81

(56) References Cited

U.S. PATENT DOCUMENTS

| 2,604,817 A | 7/1952 | Schupp ............ 88/65 |
| 4,723,077 A | 2/1988 | Wu |
| 4,943,154 A | * 7/1990 | Miyatake et al. |
| 5,146,248 A | * 9/1992 | Duwaer et al. |
| 5,210,548 A | 5/1993 | Grabowski |
| 5,217,794 A | 6/1993 | Schrenk ............ 428/220 |
| 5,233,465 A | 8/1993 | Wheatley et al. ............ 359/359 |
| 5,295,018 A | * 3/1994 | Konuma et al. ............ 359/487 |
| 5,321,683 A | * 6/1994 | Olczak |
| 5,371,559 A | * 12/1994 | San-Nohe et al. |
| 5,379,083 A | * 1/1995 | Tomita |
| 5,594,563 A | * 1/1997 | Larson |
| 5,621,486 A | * 4/1997 | Doany et al. |

FOREIGN PATENT DOCUMENTS

| AU | 622812 | 3/1991 | ............ B32B/7/02 |
| EP | 488 544 | 11/1991 | ............ G02B/5/30 |
| EP | 0 488 544 B1 | 6/1992 | |
| EP | 0 568 998 | 10/1993 | ............ G03B/27/54 |
| EP | 718 645 | 6/1996 | ............ G02B/5/30 |
| EP | 837 351 | 4/1998 | ............ G02B/27/28 |
| GB | 2177814 | 1/1987 | ............ G02B/5/08 |
| WO | WO 94/10589 | 5/1994 | ............ G02B/1/10 |
| WO | WO 99/34246 | 8/1999 | ............ G02B/27/10 |
| WO | WO 99/59005 | 11/1999 | |

OTHER PUBLICATIONS

A.E. Rosenbluth, D.B. Dove, F.E. Doany, R.N. Singh, Contrast properties of reflective liquid crystal light valves in projection displays, IBM J. Res. Develop vol. 42 No. 34 May–Jul. 1998 XP–000885154.

* cited by examiner

Primary Examiner—Ricky D. Shafer
(74) Attorney, Agent, or Firm—Yen Tong Florczak

(57) ABSTRACT

An optical imaging system including a wide-angle Cartesian polarizing beam splitter, light valve illumination optics having an $f/\# \leq 2.5$, and at least one reflective light valve. The Cartesian polarizing beam splitter (PBS) has a structural orientation defining fixed polarization axes. The use of a Cartesian PBS allows the development of systems using curved PBS that provide higher light output and/or replace or augment other optical components. By recognizing and advantageously applying properties of wide-angle Cartesian polarizers, the present invention discloses a high-efficiency optical imaging system capable of functioning at f/#'s equal to or below f/2.5 while maintaining a contrast ratio of at least 100 to 1, or, more preferably, 150 to 1 in a projection system configuration.

25 Claims, 25 Drawing Sheets

REFLECTIVE LCD PROJECTION SYSTEM USING WIDE-ANGLE CARTESIAN POLARIZING BEAM SPLITTER

The present application is a continuation-in-part of U.S. patent application Ser. No. 08/958,329, entitled "Optical Film", filed Oct. 28, 1997, now U.S. Pat. No. 5,965,247, and of U.S. patent application Ser. No. 09/126,917, entitled "Post-formable MOF and Method of Forming", filed on Jul. 31, 1998, now abandoned. Relevant portions of both are hereby incorporated by reference.

BACKGROUND OF THE INVENTION

The present invention relates to optical imaging systems including a polarizing beam splitter (PBS). More specifically, the present invention relates to an optical imaging system including a reflective imager and a Cartesian wide-angle polarizing beam splitter ("PBS") having a fixed polarization axis. The optical imaging system of the present invention is capable for use with "fast" (low f-number) optical beams while providing a high contrast ratio. The term optical imaging system is meant to include front and rear projection systems, projection displays, head-mounted displays, virtual viewers, head up displays, optical computing, optical correlation and other similar optical viewing and display systems.

Optical imaging systems may include a transmissive or a reflective imager or light valve. Traditional transmissive light valves allow certain portions of a light beam to pass through the light valve to form an image. By their very function, transmissive light valves are translucent and allow light to pass through them. Reflective light valves, in turn, only reflect selected portions of the input beam to form an image. Reflective light valves provide important advantages, as controlling circuitry may be placed below the reflective surface and more advanced integrated circuit technology becomes available when the substrate materials are not limited by their opaqueness. New potentially inexpensive and compact liquid color display (LCD) projector configurations may become possible by the use of reflective LC microdisplays.

For projection systems based on reflective LCD imagers, a folded light path wherein the illuminating beam and projected image share the same physical space between a polarizing beam splitter and the imager offers a desirable compact arrangement. The present invention analyzes and recognizes a "depolarization cascade" problem that limits the f/# of the illumination optics of traditional optical imaging systems using a PBS based on discrimination between p and s polarization states. Most reflective LCD imagers are polarization rotating; that is, polarized light is either transmitted with its polarization state substantially unmodified for the darkest state, or with a degree of polarization rotation imparted to provide a desired gray scale. A 90° rotation provides the brightest state in these systems. Accordingly, a polarized beam of light generally is used as the input beam for reflective LCD imagers. Use of a polarizing beam splitter (PBS) offers attractive design alternatives for both polarizing the input beam and folding the light path.

A PBS is an optical component that splits incident light rays into a first polarization component and a second polarization component. Traditional PBS's function based on the plane of incidence of the light, that is, a plane defined by the incident light ray and a normal to the polarizing surface. The plane of incidence also is referred to as the reflection plane, defined by the reflected light ray and a normal to the reflecting surface.

Based on the operation of traditional polarizers, light has been described as having two polarization components, a p and a s-component. The p-component corresponds to light polarized in the plane of incidence. The s-component corresponds to light polarized perpendicular to the plane of incidence.

To achieve the maximum possible efficiency in an optical imaging system, a low f/# system is desirable (see, F. E. Doany et al., Projection display throughput, Efficiency of optical transmission and light-source collection, IBM J. Res. Develop. V42, May/July 1998, pp. 387–398). The f/# measures the light gathering ability of an optical lens and is defined as:

$$f/\#=f(\text{focal length})\div D(\text{diameter or clear aperture of the lens})$$

The f/# (or F) measures the size of the cone of light that may be used to illuminate n optical element. The lower the f/#, the faster the lens and the larger the cone of light that may be used with that optical element. A larger cone of light generally translates to higher light throughput. Accordingly, a faster (lower f/#) illumination system requires a PBS able to accept light rays having a wider range of incident angles.

The maximum incident angle $\theta_{max}$ (the outer rays of the cone of light) may be mathematically derived from the f/#, F:

$$\theta_{max}=\tan^{-1}((2F)^{-1})$$

Traditional folded light path optical imaging systems have employed an optical element know as a MacNeille polarizer. MacNeille polarizers take advantage of the fact that an angle exists, called Brewster's angle, at which no p-polarized light is reflected from an interface between two media of differing index. Brewster's angle is given by:

$$\theta_B=\tan^{-1}(n_1/n_0),$$

where $n_0$ is the index of one medium, and $n_1$ is the index of the other. When the angle of incidence of an incident light ray reaches the Brewster angle, the reflected beam portion is polarized in the plane perpendicular to the plane of incidence. The transmitted beam portion becomes preferentially (but not completely) polarized in the plane parallel to the plane of incidence. In order to achieve efficient reflection of s-polarized light, a MacNeille polarizer is constructed from multiple layers of thin films of materials meeting the Brewster angle condition for the desired angle. The film thicknesses are chosen such that the film layer pairs form a quarter wave stack.

There is an advantage to this construction in that the Brewster angle condition is not dependent on wavelength (except for dispersion in the materials). However, MacNeille polarizers have difficulty achieving wide-angle performance due to the fact that the Brewster angle condition for a pair of materials is strictly met at only one angle of incidence. As the angle of incidence deviates from this angle a spectrally non-uniform leak develops. This leak becomes especially severe as the angle of incidence on the film stack becomes more normal than the Brewster's angle. As will be explained below, there are also contrast disadvantages for a folded light path projector associated with the use of p and s-polarization, referenced to the plane of reflection for each ray.

Typically, MacNeille PBS's are contained in glass cubes, wherein a PBS thin-film stack is applied along a diagonal plane of the cube. By suitably selecting the index of the glass in the cube, the PBS may be constructed so that light incident normal to the face of the cube is incident at the Brewster angle of the PBS. However, the use of cubes gives rise to certain disadvantages, principally associated with the generation of thermal stress-induced birefringence that degrades the polarization performance of the component. Even expensive pre-annealed cubes may suffer from this difficulty. Also cubes add significant weight to a compact system.

MacNeille-type PBSs reportedly have been developed capable of discrimination between s- and p-polarized light at f/#'s as low as f/2.5, while providing extinction levels in excess of 100:1 between incident beams of pure s or pure p polarization. Unfortunately, as explained below, when MacNeille-type PBSs are used in a folded light path with reflective imagers, the contrast is degraded due to depolarization of rays of light having a reflection plane rotated relative to the reflection plane of the principal ray. As used below, the term "depolarization" is meant to describe the deviation of the polarization state of a light ray from that of the principal light ray. As light in a projection system generally is projected as a cone, most of the rays of light are not perfectly parallel to the principal light ray. The depolarization increases as the f/# decreases, and is magnified in subsequent reflections from color selective films. This "depolarization cascade" has been calculated by some optical imaging system designers to effectively limit the f/# of MacNeille PBS based projectors to about 3.3, thereby limiting the light throughput efficiency of these systems. See A. E. Rosenbluth et al., Contrast properties of reflective liquid crystal light valves in projection displays, IBM J. Res. Develop. V42, May/July 1998, pp. 359–386, (hereinafter "Rosenbluth Contrast Properties") relevant portions of which are hereby incorporated by reference.

Recently, Minnesota Mining and Manufacturing has developed a novel type of birefringent polymeric multi-layer polarizing film ("3M advanced film"). Co-assigned and co-pending parent application 49837USA6E Beam Splitter, describes the use of a such a film as a polarizing beam splitter. European Patent Application EP 0 837 351 A2 attempts to utilize 3M dual brightness enhancing film (DBEF), an early 3M multi-layer film material, in a projection display apparatus having a "wide angle" reflecting polarizer. Such reference refers to p and s differentiation and uses the 3M material as a common reflective polarizer. Moreover, while "wide-angle" performance is a widely recognized design goal, references to "wide-angle" are meaningless absent contrast limits and spectral leak reduction and teachings on how to achieve such a goal. The 3M product "DBEF" is a reflective polarizer with typical block direction leakages of 4 to 6 percent at normal incidence. At higher angles the leakage is somewhat reduced, but at 45 degrees the extinction is typically still a few percent. Contrast ratios when using DBEF typically will be limited to maximum values at or below 99:1 for white light. However, DBEF suffers from spectral leaks that reduce the contrast of certain color bands to as low as 25:1, depending on the nature of the illumination source and the exact DBEF sample. To obtain superior performance it is desirable that good screen uniformity and the absence of spectral leaks in the dark state accompany good average contrast in all relevant color bands.

The need remains for an optical imaging system that includes truly wide angle, fast optical components and that may allow viewing or display of high-contrast images.

SUMMARY OF THE INVENTION

The present invention describes an optical imaging system including and advantageously employing a wide-angle "Cartesian" polarizer beam splitter ("PBS"). A Cartesian PBS is defined as a PBS in which the polarization of separate beams is referenced to invariant, generally orthogonal principal axes of the PBS film. In contrast with a MacNeille PBS, in a Cartesian PBS the polarization of the separate beams is substantially independent of the angle of incidence of the beams. The use of a Cartesian PBS film also allows the development of systems using curved PBS that provide higher light output and/or replace or augment other optical components.

A wide-angle PBS is defined as a PBS capable of receiving a cone of light rays with an angle of incidence up to 11° or more, while maintaining acceptable system contrast. By recognizing and advantageously applying properties of wide-angle Cartesian polarizers, the present invention discloses a high-efficiency optical imaging system capable of functioning at f/#'s equal to or below f/2.5 while maintaining a contrast ratio of at least 100 to 1, or, more preferably, 150 to 1 in a projection system configuration.

An optical imaging system in accordance with the present invention includes a wide-angle Cartesian polarizing beam splitter, light valve illumination optics having an f/#≦2.5, and at least one reflective light valve. The Cartesian polarizing beam splitter (PBS) has a structural orientation defining fixed polarization axes. A reflective Cartesian PBS substantially reflects those components of a beam of light which are polarized along one such fixed axis, called the Material Axis. Those components of a beam of light with polarization not along the Material Axis are substantially transmitted. The polarizing beam splitter therefore splits incident light into a first and a second substantially polarized beam having polarization states referenced to the fixed polarization axes and the polarizing beam splitter directs the first polarized beam onto the reflective light valve. In an exemplary embodiment, the Cartesian PBS includes 3M advanced film. In other exemplary embodiments, the PBS may include a wire grid polarizer, such as those described in Schnabel et al., "Study on Polarizing Visible Light by Subwavelength-Period Metal-Stripe Gratings", Optical Engineering 38(2), pp. 220–226, February 1999, relevant portions of which are hereby included by reference. Other suitable Cartesian polarizers also may be employed.

The light valve illumination optics have an f/# of at most 2.5, a minimum cone angle of about 12 degrees and the system has a contrast ratio exceeding 100 to 1 using an ideal imager. In preferred embodiments, the contrast ratio exceeds 150 to 1 and the illumination optics have an f/# equal or less than 2.0. The illumination optics are those optics that condition (e.g., prepolarize, homogenize and filter) the light beam. The f/# is associated with the beam of light incident on the imager.

The light valve may be a polarization modulating light valve, including smectic or nematic liquid crystal light valves. The optical imaging system may further comprise a pre-polarizer that polarizes input light into pre-polarized light, the pre-polarized light comprising the incident light on the polarizing beam splitter. The optical imaging system also may include a color separation and recombination prism or mirrors and a plurality of reflective light valves. The prism receives the polarized light from the polarizing beam splitter, color separates the polarized light and directs polarized color beams to each light valve. The optical imaging system may include a suitable light source that supplies the incident light.

In alternative embodiments, the reflective light valve may reflect at least a portion of the first polarized beam back to the original polarizing beam splitter or to a second PBS.

DETAILED DESCRIPTION OF THE INVENTION

Figure 1:
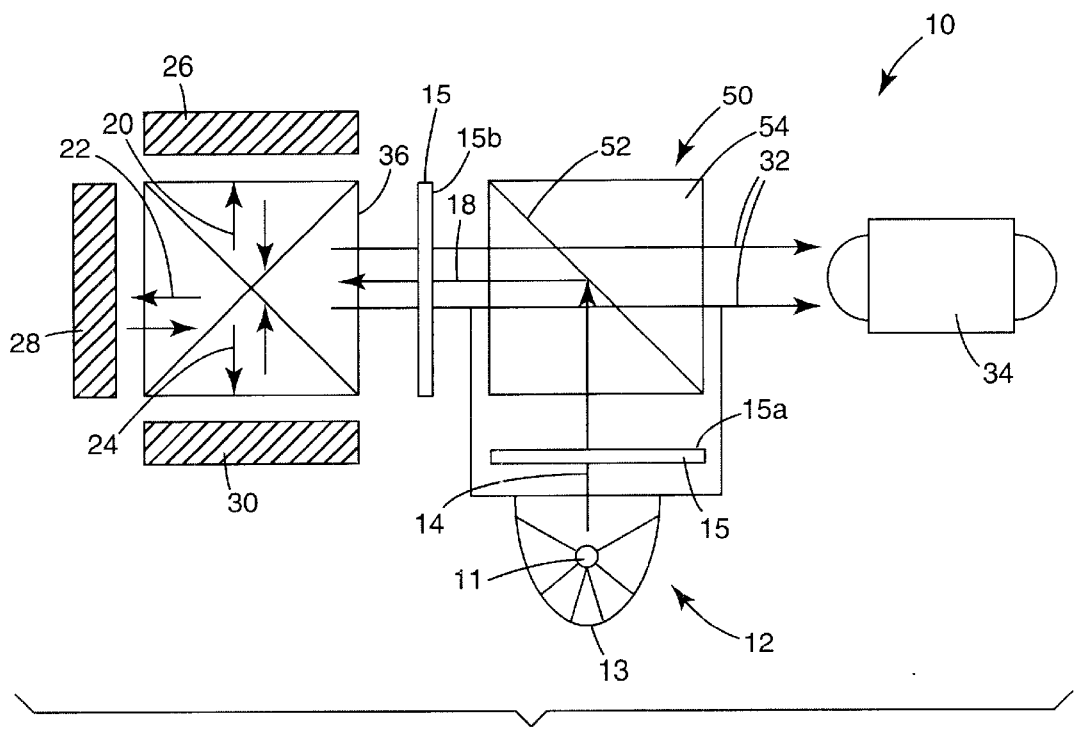
FIG. 1 is a plan view of a simplified schematic of an optical projection system in accordance with the present invention.

FIGS. 1–4 illustrate simplified schematic illustrations of exemplary embodiments of optical imaging systems in accordance with the present invention. The present invention describes various optical imaging systems that are advantageously designed to include and take advantage of a Cartesian PBS and high-speed illumination optics. For the reader's convenience, similar elements are identified by reference numerals having the same last two digits, however, such nomenclature is not intended to limit the scope of the present invention.

Since a Cartesian PBS has a fixed Material Axis of polarization, the present invention refers to light as having polarization component referenced in relation to the x and y axes of the Cartesian PBS rather than to the traditional p and s axis of MacNeille PBS. For a principal ray of any of FIGS. 1 through 4, the x-component has a polarization direction contained within the reflection plane, and is therefore identical with p-polarization of a principal ray, while the y-component has an E field oriented perpendicular to the reflection plane, and is identical with s-polarization of a principal ray.

FIG. 1 illustrates an optical display or imaging system 10 including a light source 12, providing a beam of light 14. The light source 12 includes a lamp 11 and a reflector 13.

Suitable lamps include Xenon, incandescent, laser, LED, metal halide arc or high-pressure mercury light source(s). The beam of light 14 passes through illumination optics 15, which may pre-polarize the light, and impinges upon a Cartesian PBS element 50.

The Cartesian PBS element 50 includes a layer of 3M advanced multi-layer polymeric film (3M advanced film) 52 encased in a glass cube 54, and oriented so as to reflect light incident with y polarization.

While MacNeille PBS systems typically are constrained to be embedded in glass cubes providing the specific index of refraction required to adjust the Brewster's angle to a desired value (typically 45°), the exemplary Cartesian PBS's of the present invention are not. Wire grid polarizers or 3M advanced film polarizers, may be used alone (see FIGS. 2 and 3) though they also may be used in cube configurations. Most 3M advanced film polarizers used in the present embodiment function best between sheets of glass or as a pellicle, i.e. in configurations where-in the angles of transmission through the film are turned toward the film normal by Snell's law as the light enters the material medium. Other 3M advanced multi-layer film PBS's have been prepared which function well in glass cubes of arbitrary index, where-in the angles of transmission through the film have not been turned toward the film normal as the light enters the embedding medium from air.

Films which function well in glass cubes have additional requirements to ensure appropriate values of the anisotropic indexes of refraction for each layer, especially in the direction normal to the surface of the film. Specifically, the indices of refraction in the thickness direction the film, of alternating layers, are ideally the same. This is in addition to the indices in theX direction (pass direction) of the polarizer being equal. For a polarizer to have high transmission along its pass axis for all angles of incidence, both the X and Z (normal to the film) indices of the alternating layers must be matched. Achieving a match for both the X and Z indices requires a different material set than that used when only the X index is matched. Older 3M multi-layer films, such as 3M brand "DBEF" film, were made in the past with a match to the X index.

One method of matching both the X and Z indices of all the layers is to impart a true uniaxial stretch wherein the film is allowed to relax (i.e. shrink) in both the X and Z directions while it is being stretched in the Y direction. In such a manner, the X and Z indices of refraction are the same in a given layer. It then follows that if a second material is chosen which matches the X index of the first material, the Z indices must also match because the second material layers are also subjected to the same stretching conditions.

In many practical applications, a small Z index mismatch between these layers is acceptable, depending on the angle the light makes to the film layers. However, when the film is laminated between glass prisms, i.e., immersed in a high index medium, the light rays are not bent toward the normal to the film plane. In this case the light ray will sense the Z index mismatch to a much greater degree compared to incidence from air, and a ray of X-polarized will be partially or even strongly reflected. The higher the angle the light ray makes to the film normal inside the film, the closer the Z index match must be.

The allowed magnitude of the Z index mismatch is always relative to the Y index mismatch because the latter value determines the number of layers required in the polarizer thin film stack. The total reflectivity of a thin film stack is controlled equally by the index mismatch $\Delta n$ and the number of layers in the stack N, i.e., the product $\Delta n \times N$ determines the reflectivity of a stack. For example, to provide a film of the same reflectivity but with half the number of layers requires twice the index differential between layers, and so forth. The ratio of $\Delta n_Z/\Delta n_Y$ is the relevant parameter that must be controlled. For a beamsplitter film intended for use in air, the ratio $\Delta n_Z/\Delta n_Y$ is preferably less than 0.5 and more preferably less than 0.2. For film immersed in a higher index medium such as glass, the ratio $\Delta n_Z/\Delta n_Y$ is preferably less than 0.2, more preferably less than 0.1 and most preferably less than 0.05.

$\Delta n_Z$ must also be very small compared to $\Delta n_Y$ and if $\Delta n_Z$ is very small, the ratio is preferably less than 0.1 for films used in air. For immersed films the ratio is preferably less than 0.1 and most preferably less than 0.01. However, as described in co-assigned U.S. patent application, Ser. No. 08/958,329, relevant portions of which are hereby incorporated by reference, if $\Delta n_Z$ is not zero, then a small mismatch in the X indices can be used to improve the transmission of p-polarized light.

The Z index mismatch is irrelevant for the transmission of s-polarized light. By definition, s-polarized light does not sense the Z-index of refraction of a film. However, as will be shown below, the reflective properties of birefringent multilayer polarizers at various azimuthal angles are such that a projection system performance is superior when the beam splitter is configured to reflect y polarized (approximately s-polarized) light and transmit x-polarized (approximately p-polarized) light. A beam splitter that reflects x-polarized light and transmits y-polarized light would work well along the moor optic axes, but for a light ray having a finite cone angle, the contrast degrades quickly as the cone angle increases. For film immersed in a cube, the problem is even more severe. For optical systems having a large cone angle and requiring a high contrast ratio, the preferred PBS configuration reflects y-pol and transmits x-pol.

Use of the cube configuration is especially advantageous in cases where sensitivity to astigmatism, such as that created by light passing through a tilted glass slab, is high, or where a reduced optical path length is important. The cube configuration has the disadvantages, shared by MacNeille polarizers, of suffering from thermally induced stress-optical effects and increased weight.

Referring again to FIG. 1, a polarized beam 18 comprising the y-components of the beam 14 is directed towards a color splitter/combiner prism 36, that splits the y-polarized beam 18 into three sub-beams 20, 22, and 24. The polarized sub-beams 20, 22, and 24 are reflected and modulated respectively off red, green and blue reflective imagers 26, 28, and 30. Generally, current reflective LCD light valves have ordinary and extraordinary axes for their dark and light states which are best described in fixed Cartesian coordinate, and the fixed polarization axes of Cartesian PBS are better suited to match the Cartesian construction of the imagers.

The reflected and modulated sub-beams are recombined by the combiner 36 into a combined beam 32 having x-polarization. The modulated components of the combined beam 32 pass through the PBS element 50 and are projected as an image by projection lenses 34.

The exemplary illumination optics 15 in the present embodiment may include a pre-polarizer or polarization converter 15a before the PBS cube 50, and a cleanup polarizer 15b after the PBS cube 50.

Figure 2:
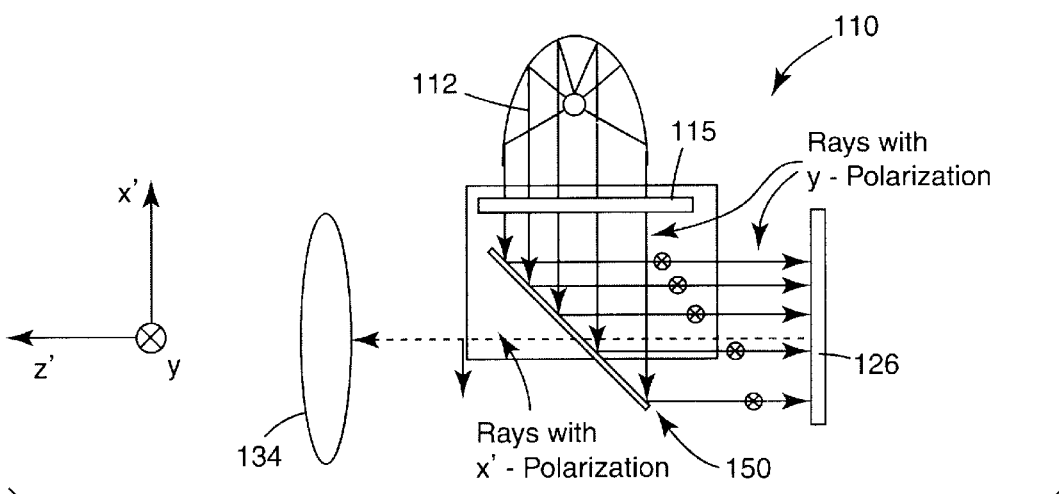
FIG. 2 is a plan view of a simplified schematic of a second embodiment of an optical projection system in accordance with the present invention.

The illumination optics 15 illuminates the imagers 26, 28, and 30 with light having an f/# equal to or lower than 2.5. The imagers 26, 28 and 30 may be smectic, nematic, or other suitable reflective imagers. The imagers 26, 28, and 30 of the optical imaging system 10 of FIGS. 1 and 2 are smectic LCD imagers, such as ferroelectric liquid crystal display (FLCD) imagers. The combination of a Cartesian PBS and a smectic LCD imagers allow optical systems having a very low f/#. Smectic LCD's such as FLCD's, typically have particularly wide acceptance cones, and therefore better take advantage of the low f/# capabilities of the systems in accordance with the present invention. The combination of a multi-layer polymeric PBS with FLC reflective imager device takes advantage of the low f/# capabilities and fast optical beams that may be used with the present invention. Exemplary smectic light valves include ferroelectric liquid crystal display (FLCD), anti-FLCD (AFLCD), analog FLCD and electroclinic LCD mode light valves. Exemplary nematic liquid crystal light valves include twisted, vertically aligned, hybrid aligned, and Pi-cell.

FIG. 2 illustrates a second embodiment of a projection system 110, including a light source 112, such as, for example, an arc lamp with a reflector. The light source could also be a solid state light source, such as light emitting diodes or a laser light source. The system 110 further includes a Cartesian PBS 150, an imager 126, illumination optics 115, and a focusing lens 134. The PBS 150 is a freestanding Cartesian PBS, such as a wire grid polarizer or a 3M advanced multi-layer film laminated between glass panes. FIG. 2 illustrates the beam path and ray polarization. Light with y-polarization (approximate s-polarization) is indicated by the circled x, showing that the polarization is into the page. Light with x-polarization (approximate p-polarization) is indicated by the solid arrow depicting the polarization vector. Solid lines indicate incident light, while dashed lines show light that has been returned from the imagers with a changed polarization state. Light, provided by the source, is conditioned by the illumination optics 115. The y components of the light are reflected by the Cartesian PBS 150 and impinge on reflective imager 126. The reflective imager reflects and modulates an image beam having x polarization. The reflected x-polarized beam is transmitted by the PBS 150 and is focussed by the focussing lens 134. Many design specific components of a projection system, such as filters for the light, beam homogenizers, polarization converters, relay or field lenses and the like, are omitted from the figures as unnecessary to this discussion, but may be placed by those skilled in the art.

Figure 3:
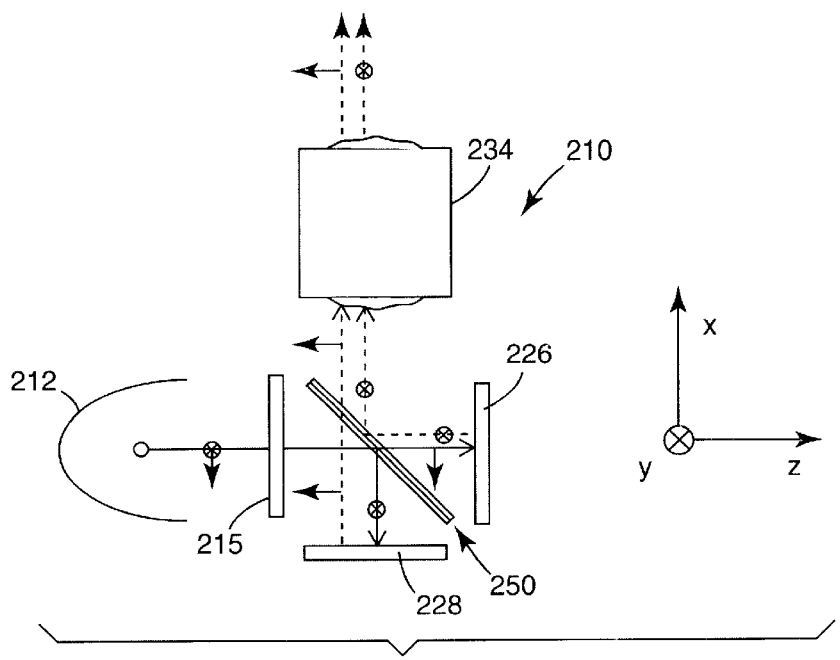
FIG. 3 is a plan view of a simplified schematic of a third embodiment of an optical projection system in accordance with the present invention.

FIG. 3 illustrates a third embodiment of a projection system 210 in accordance with the present invention that also uses the transmitted x-polarized components of the original beam. The system 210 includes a light source 212, a Cartesian PBS 250, a first imager 226, a second imager 228, illumination optics 215, and a projection lens 234. The imagers 226 and 228 are sequential color or monochrome. Light from the light source 212 passes through the illumination optics 215 and is incident on the PBS 250. The PBS transmits the x-polarization component of the light and reflects the y-polarization component. The x-polarization component is reflected and modulated by the first imager 226 into a y-polarized beam that is reflected by the PBS 150 into the projection lens 234. The y-polarization components are reflected and modulated by the second imager 228 into an x-polarized beam that is transmitted by the PBS 250 into the projection lens 234. Light returned from the projector in its original polarization state is not depicted on the figure. This light will return from the imager and the PBS will direct the light back toward the lamp.

Figure 4:
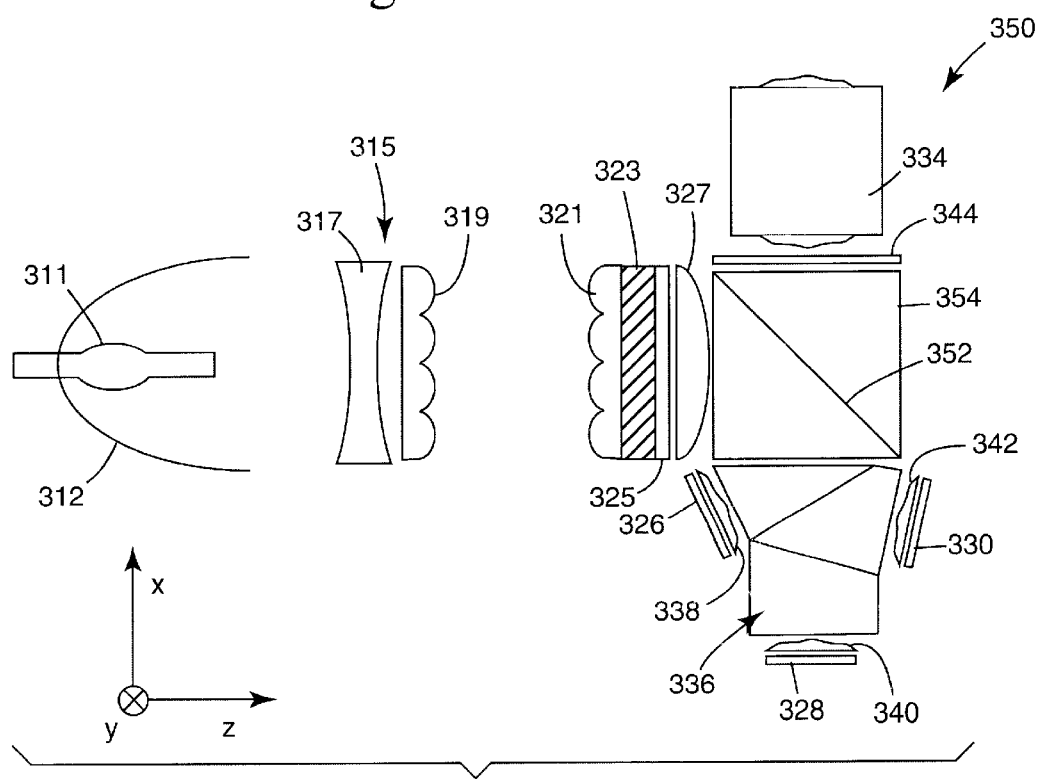
FIG. 4 is a plan view of a simplified schematic of a fourth embodiment of an optical projection system in accordance with the present invention.

FIG. 4 illustrates a fourth exemplary embodiment of a projection system 310 in accordance with the present invention having a light source 312. Light is generated by an arc lamp 311 and collected by an elliptical reflector 313, which sends the light toward illumination optics 315. The illumination optics 315 include a collimating lens 317, a first lenslet array 319, a second lenslet array 321, and a condensing lens 327. Between the second lenslet array 321 and the condensing lens 327, an optional polarization converter 323, such as those of a Geffcken-type design, may follow. Depending on the conversion efficiency of the polarization converter 323, it may be advantageous to include an optional pre-polarizer 325, immediately following the polarization converter. The pair of lenslet arrays 319 and 321 receives nominally collimated light from the collimating lens 317. The polarization converter 323 and the prepolarizer 325 polarize the light in the desired direction.

The lenslet arrays 319 and 321 and the condensing lens 327 serve to shape and homogenize the light in order to illuminate evenly the reflective imagers 326, 328 and 330. A Cartesian PBS 350 will then redirect the y-polarized light towards three reflective imagers 326, 328 and 330. The PBS surface 352 may be free standing, between glass plates, or encased in a glass prism 354 as shown in FIG. 4.

In a three-imager configuration, such as that shown in FIG. 4, separating the light with a color-separating prism 336 into its primary components generates the colors: red, green, and blue. Intervening lenses, such as field lenses 338, 340 and 342, may be inserted between each imager and the color-separating prism 336 to further optimize the optical response of the entire system. The imagers 326, 328, and 330 will modulate the polarization state of the light upon reflection to varying degrees depending on particular image information. The color-separating prism 336 recombines the red, green, and blue images and passes the light to the Cartesian PBS 350, which analyzes the polarization state of the image by passing substantially only the x-polarized light. The y-polarized light is redirected back towards the light source 312. The light that passes the Cartesian PBS 350 is collected by the projection lens 334 and focussed onto a front or rear projection screen (not shown) for viewing. An optional post-polarizer 344 may be inserted between the PBS 350 and the projection lens 334. One skilled in the art will realize that other optical configurations are possible.

The Cartesian polarizers even may be curved along one or two axes. MacNeille PBS systems or Frustrated Total Internal Reflection PBS systems do not offer such flexibility.

Utilizing a large percentage of lamp output in a projection system is difficult and requires the use of specialized optical components. Reflective optics are often utilized on the back side of the lamp. A projection system that utilizes a wide cone angle (small f-number) allows for an increased in efficiency as well. The 3M advanced multi layer birefringent Polarizing Beam Splitter (PBS) offers one of the widest angle of acceptance for the full visible spectrum. Further advantages of the multi layer birefringent PBS are the possibilities of combining its beamsplitting/reflecting functions with its flexibility/formability properties. FIGS. 5, 7, 8 and 9 illustrate alternative embodiments of optical imaging systems in accordance with the present invention including curved, or non-planar, Cartesian PBS. It is well known in the art that reflective optics offer a more compact and simpler system for handling low f-number cones of light than refractive optics. The multi layer PBS films described herein are both reflective and transmissive, depending on the polarization state of the incident light. Thus, a concave multi-layer polarizing film could be used both as a wide angle beamsplitter and as a part of the beam focusing optics in a projection system.

Figure 5:
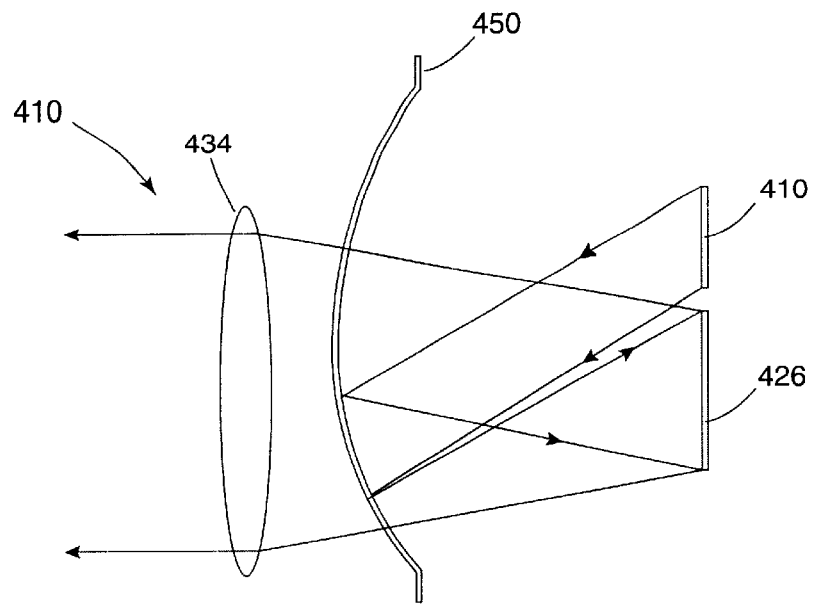
FIG. 5 is a perspective drawing of a curved PBS which may be used in place of one or more beam shaping lenses in an optical system.

A curved PBS could be used in place of one or more beam shaping lenses in the system as shown schematically in FIG. 5. FIG. 5 illustrates an optical imaging system 410 including a curved Cartesian PBS 450, a light source 412, a reflective LCD imager 426 and an eyepiece lens 434. The light source 412 may contain reflective and refractive beam shaping and conditioning elements.

Depending on the system, and its end use application, the curved PBS 450 may be curved along one or two orthogonal in-plane axes, i.e., it may possess either a simple or compound curvature. Systems utilizing a PBS that has a curvature along one axis may require cylindrical lenses to shape the beam along the orthogonal axis.

Curved polarizers may be useful in both front and rear projection systems, as well the so called micro displays which project directly into the viewer's eye, or systems which form a virtual image by reflection from a semitransparent surface as in the "heads up" display.

The extinction of crossed polarizers, when presented as a circular (radial) plot of extinction vs azimuthal angle, for a constant angle of incidence, forms the well known "Maltese Cross" shape.

The insertion of a birefringent compensation film or plate between the crossed polarizers will increase the extinction at all angles between the major axes, and essentially broadening the cross to a circular (angle independent) shape. Significant compensation can also be provided by the use of curved polarizer without the need for the birefringent compensation film.

Figure 6:
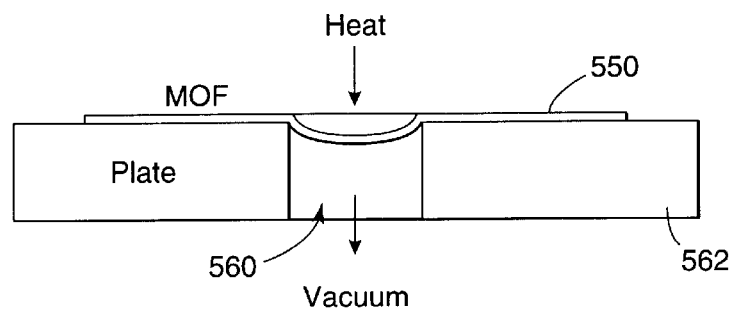
FIG. 6 depicts a means for imparting a 2-dimensional curvature to a 3M multilayer polymeric PBS film.

A 2D curved PBS has been reduced to practice using the technique diagrammed in FIG. 6. A 3M multi layer reflective polarizer optical film ("MOF") 550 was stretched over a hole 560 in a plate 562 and a vacuum was applied to pull the film 550 through the hole 560. Heat was applied with a heat gun to soften the film 550 and deepen the sag. When cooled, the film retained its concave shape. The curved MOF acted as a curved Cartesian PBS, focusing the reflected light of one polarization and transmitting the orthogonal polarization. Multiple diameters and heating times were tried. In all cases, the polarization extinction was maintained out to the very edge of the concave shape. A curved PBS with an elliptical edge could also be made by vacu-forming through an elliptical hole. The axis of polarization of the curved PBS could be controlled, depending on the alignment of the optical axes of the MOF to the major axis of the hole.

Figure 7:
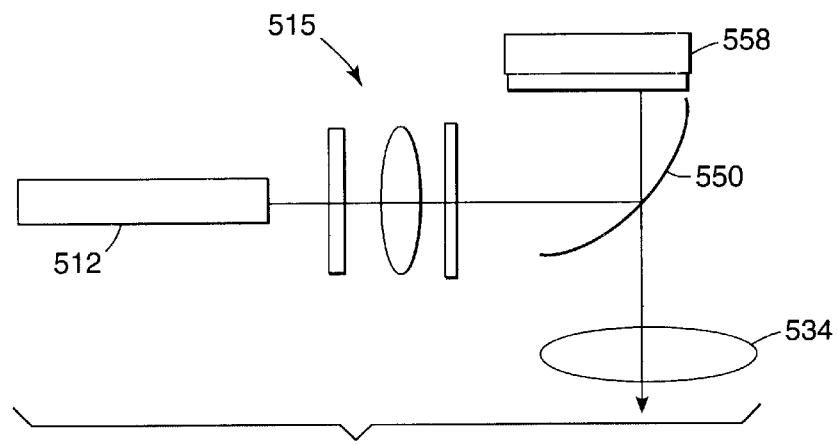
FIG. 7 depicts the optical train of a micro-display using a curved PBS.

The optical train of a micro-display using a curved PBS was demonstrated, as illustrated in FIG. 7. Light from a diffuse source 512 was passed through illumination optics 515, pre-polarized, reflected off of the curved PBS 550 and reflected off of a quarter-wave mirror (QWM 558). The resulting polarization rotation allowed the light to then pass through the PBS 550 to an eyepiece 534. The curvature served to concentrate the illumination light onto the QWM 558 that resulted in a brighter image than that from a planar PBS. Rotating the QWM 558 45° about the normal axis transforms the QWM 558 into a simple mirror and presented a dark state to the eyepiece 534 that included a dark central band characteristic of thin film polarizers. It was observed that the image of the QWM 558 in the bright state angular range was compressed in horizontal plane.

A mathematical model was used to compute the locus of focal points from both spherical and elliptical curved mirrors. For an elliptical cross section with ellipticity e=a/b, where a and b are the respective major and minor axes, the focal length of the mirror (measured from the bottom of the "bowl") is $F \cong be^2/2$. This result shows that for compact designs, i.e., short focal lengths, e<1(oblate ellipse).

The simulations showed that there was not a great performance advantage to elliptical shapes for a given focal length (F=R/2 has very similar performance). It also became evident that ray angle distortions and illumination uniformity are minimized at near normal incidence to the curved PBS.

Referring back to the system 410 illustrated in FIG. 5, by placing the source (a diffuse small backlight) 412 and imager 426 co-planar, and along the same axis as the eyepiece 434, good illumination was obtained off the imager 426 with no apparent image distortion. It was also found that the distance between the source/imager plane and the curved PBS 450 was not particularly critical. The most compact design has the center of the curved PBS 450 aligned with the common edge of the imager 426 and the adjacent source 412. Tilting the source 412 improved illumination somewhat. The output of the source was polarized by a dichroic polarizer.

Figure 8:
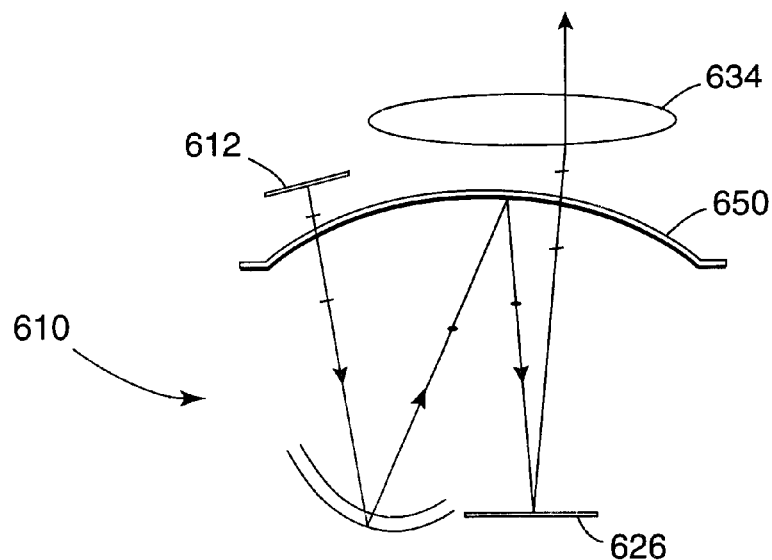
FIG. 8 illustrates an embodiment wherein the light source is above the imager. A curved QWM is used to rotate the polarization of the incident light initially transmitted through the curved Cartesian PBS.

FIG. 8 illustrates another embodiment, optical imaging system 610, where the source 612 is above the imager 626. A curved QWM 658 is used to rotate the polarization of the incident light initially transmitted through the curved Cartesian PBS 650. The additional beam shaping from the curvature of the QWM 658 may be used to optimize the illumination of the imager 426.

One can also eliminate the retarder film by placing the source on the imager side of the PBS, or by truncating the PBS and placing the source adjacent to the truncated edge.

Figure 9:
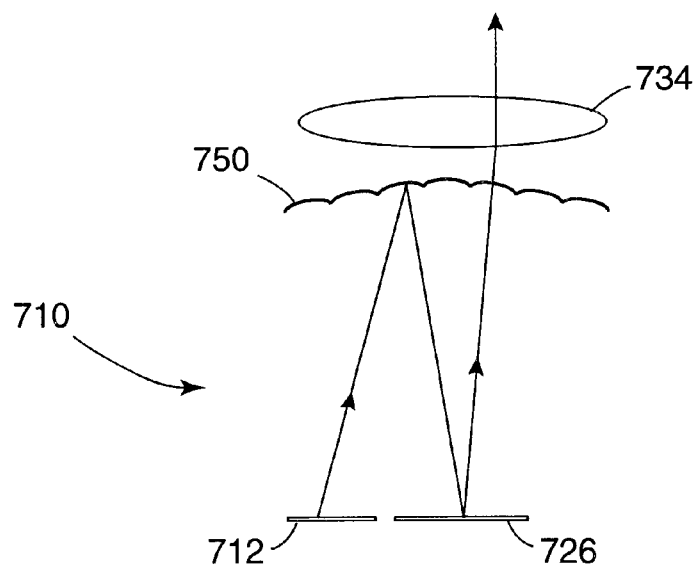
FIG. 9 illustrates an optical imaging system including a lenslet-shaped Cartesian PBS.

A MOF polarizer can be shaped into a multiplicity of curved surfaces to create a means to image an inhomogeneous source onto a plane or other desired loci to improve homogeneity. This could be used to replace or augment a lenslet array commonly employed in projection systems to provide uniform illumination. FIG. 9 illustrates an optical imaging system 710 including a lenslet-shaped Cartesian PBS 750. Experimentation has shown that the source area 712 was optimally trapezoidal in shape to obtain uniform illumination onto the imager 726.

Figure 10:
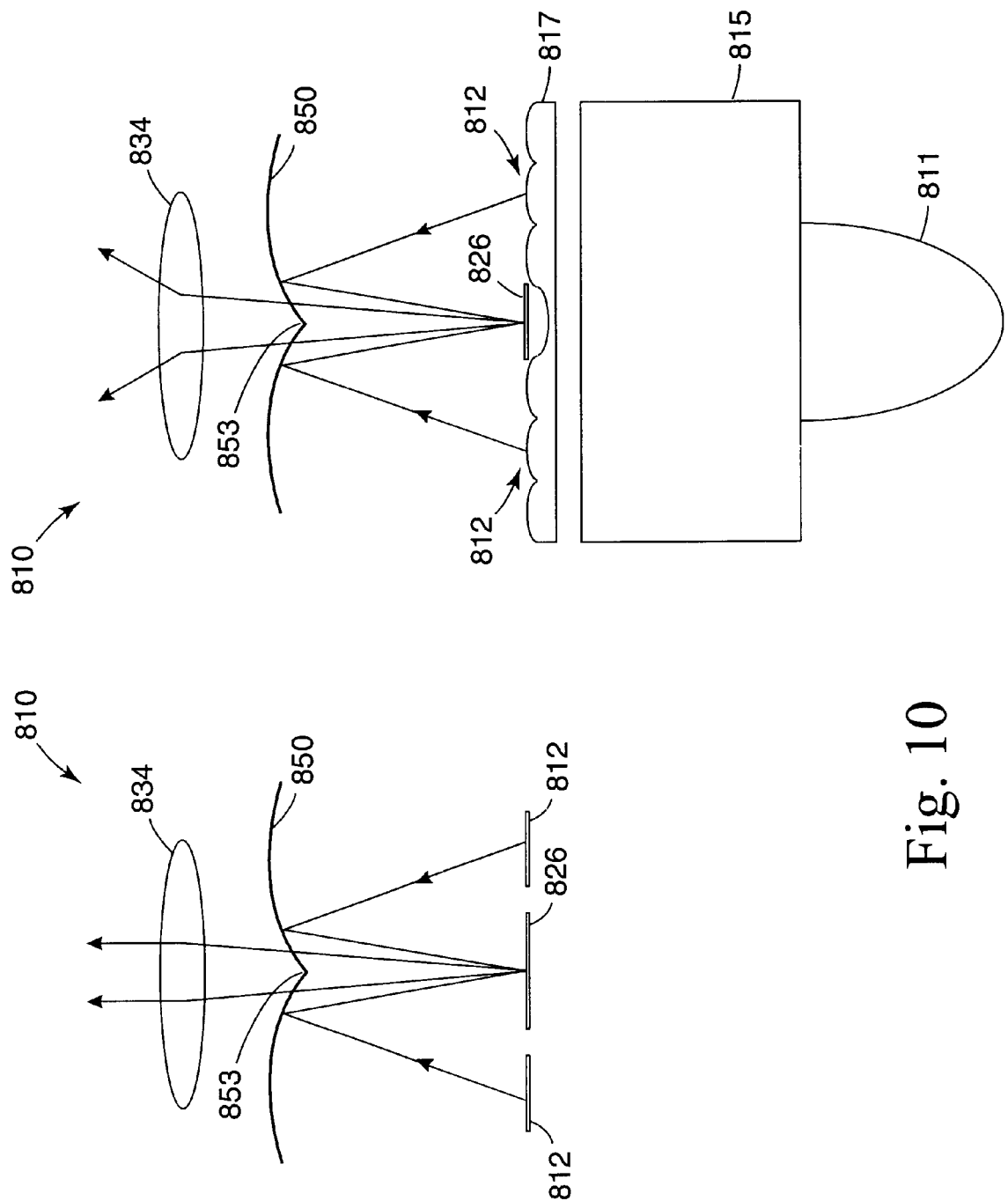
FIG. 10 illustrates an optical imaging system including a double-curve Cartesian PBS and dual light source planes.

FIG. 10 illustrates an optical imaging system 810 including a double-curve Cartesian PBS 850 and a dual light source planes 812. As illustrated in FIG. 10b, a single lamp 811, illumination/conditioning optics 815 and a lenslet array 817 may be used to provide the dual light source planes 812. The dual source beams are reflected off the curved Cartesian PBS 850 and then off the imager 826. A projection lens or eyepiece 834 prepares the transmitted beams for projection or viewing. Use of two sources (or two source planes) is possible if two curved PBS's are used, joined at one edge (could be one molded piece). The union line 853 would ideally be above the center line of the imager. The same concept could be used in projection systems where the "source planes" represent planes of homogeneous illumination.

As a practical matter, compound angle depolarization effects, also referred to as depolarization cascade, limit the use of very fast optics in traditional reflective imager projection systems. FIGS. 11–18 illustrate the compound angle depolarization effects or depolarization cascade problem. MacNeille PBS systems based on Brewster angle reflection are more adequately described in cylindrical coordinates around the normal axis of the PBS coating, as the function of the MacNeille PBS depends on the angle of incidence of the incident light. However, imaging systems include imagers that function with respect to fixed orthogonal axes. The ramifications of this qualitative difference can be discerned by considering the prepolarized light rays, Rays 1–4, depicted in FIGS. 11 and 12. In these figures the x, y and z axes are referenced with respect to the principal ray, with the z axis parallel to the propagation vector of the principal ray and the y axis aligned with the pre-polarizer transmission axis. The x, y and z axes are shown for the light passing between a pre-polarizer and a PBS. The y-axis is referenced in the present example as the vertical direction. The principal ray is normal to the surface of the reflective imager. The axes of the rays after reflection from the PBS are identified by x', y', and z'. Note that the directions y and y' are parallel.

Real light sources project light beams in the shape of a cone, where all the light rays are not perfectly collimated. Real projection systems, therefore, generally use cones of light. These cones are defined by a cone angle. The cone angle is the smallest angle that includes all of the rays from that beam of light that may be used by the projection system.

Figure 11:
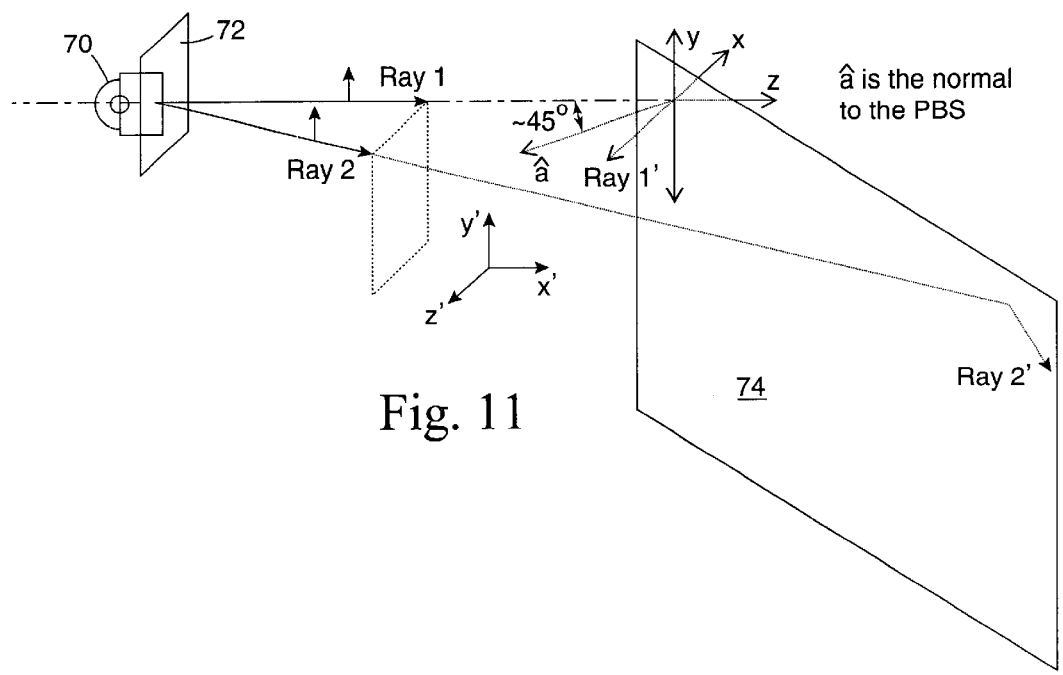
FIG. 11 is perspective view of a ray diagram for a principal ray and a horizontally angled skew ray.
Figure 12:
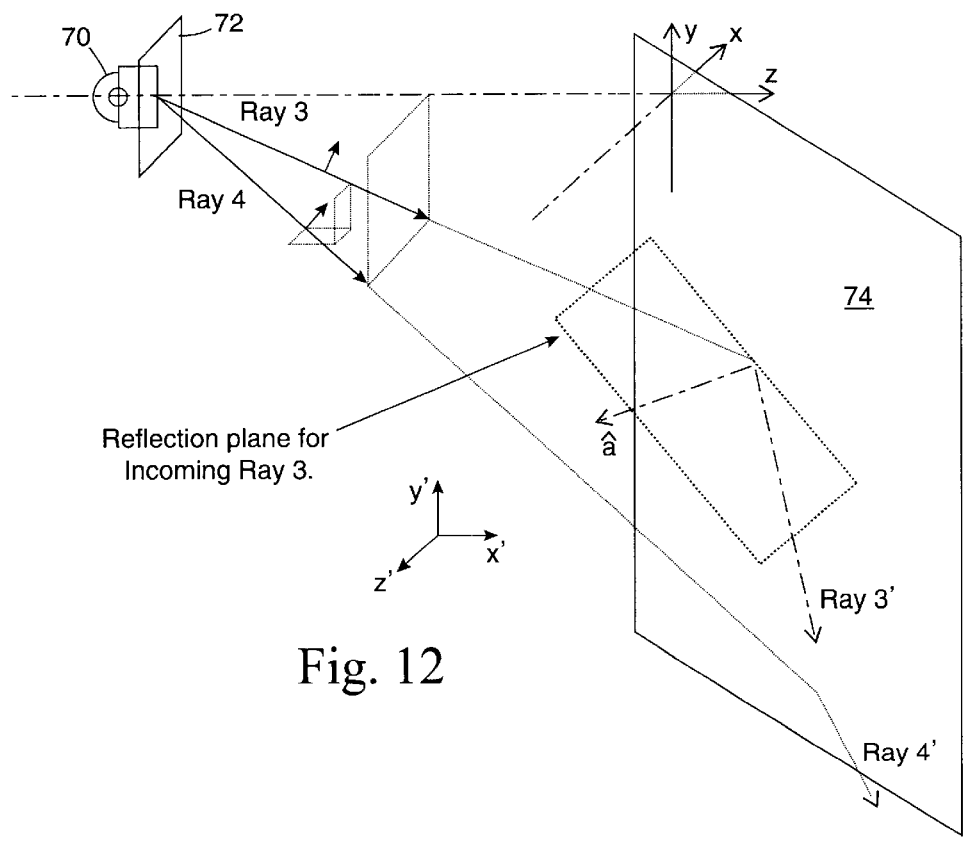
FIG. 12 is perspective view of a ray diagram for two types of vertically angled skew rays.

Rays 1, 2, 3 and 4 in FIGS. 11 and 12 illustrate four different types of light rays found in such a cone of light. A light source 70 produces a light cone that is first conditioned by a pre-polarizer 72. For illustrative purposes, the rays are shown with large values of deflection. It should be understood that all rays would be incident upon a PBS 74. Ray 1 is a principal ray parallel to a z-axis. Rays 2–4 are skew rays, that is, rays that are not parallel to the principal axis (z). The propagation vector, $k_2$, of Ray 2 has an x component and is horizontally angled, that is, the end of the $k_2$ vector is horizontally displaced in the horizontal x-z plane from that of a principal ray originating from the same location on the pre-polarizer as Ray 2. The propagation vector of Ray 3, $k_3$, has a vertical component and is vertically angled (the end of the $k_3$ vector is vertically displaced in the vertical y-z plane from that of a principal ray originating from the same location on the pre-polarizer as Ray 3). Ray 4 is both vertically and horizontally angled. The relative amounts of each of these four types of rays in the cone of light of a projection system will depend on the details of the illumination system. A common metal halide or Xenon lamp source in a typical illumination system will, from simple phase space considerations, provide very few type 1 rays, as many type 2 as type 3 rays, and more type 4 rays than of any other type.

Ray 1 of FIG. 11 is a principal ray of the projection system and is pre-polarized in the y direction by the pre-polarizer 72. Ray 1 will be 100% reflected by a perfect reflective polarizer oriented to reflect either y or s polarization, be it a Cartesian polarizer or a MacNeille polarizer. The pure y polarization of this ray is also pure s-polarization for the MacNeille PBS, that is, the polarization vector is perpendicular to the reflection plane for the ray as it is reflected by the PBS (the x-z plane of FIG. 11). If subsequently reflected from a mirror or mirror-like imager placed along and perpendicular to the z' axis, Ray 1 will remain both purely y and purely s polarized after reflection, and be reflected back into the light source with high efficiency. Thus rays of light similar to Ray 1 will provide a very good, low leakage dark state, and a very high contrast ratio when used with either a Cartesian or a MacNeille PBS. Unfortunately, most light sources cannot provide only perfectly collimated light.

Ray 2 has been horizontally deflected from Ray 1, so that Ray 2 has a propagation direction ($k_2$ vector) having an x component. Ray 2 is contained in the x-z plane, that is, Ray 2 has an angular displacement within the horizontal plane. Because the x-z plane is still the reflection plane, Ray 2 is still purely y polarized both before and after reflection from the PBS, and after reflection from a mirror-like imager placed along and perpendicular to the z' axis. Ray 2 also has the property that y polarization is identical to s polarization, so once again both ideal MacNeille and ideal Cartesian polarizers should provide equivalent, high contrast for Ray 2-type rays, so long as the deflection does not cause the ray to deviate too much from the Brewster's angle. If this happens, the MacNeille polarizer will reflect both s and p polarized light, causing the ray returning from the imager to be reflected back to the lamp.

Figure 18:
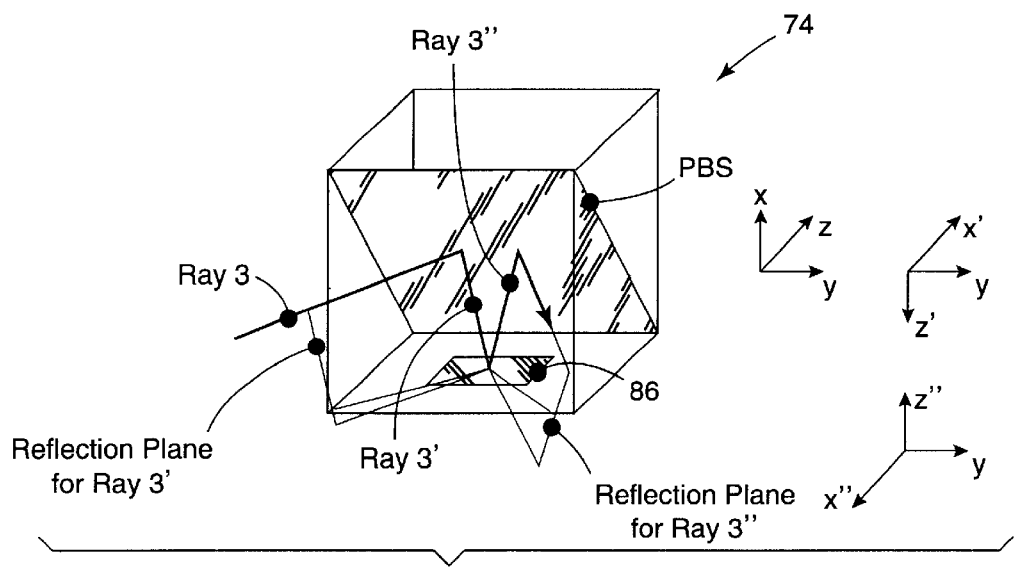
FIG. 18 is a perspective simplified view of the path of a skew ray reflected off a PBS and off a reflective imager.

Ray 3 in FIG. 12 has been deflected from Ray 1 such that Ray 3 is contained in the y-z plane. Ray 3 is vertically skewed with respect to Ray 1 and is angularly displaced along the vertical plane. Now, in addition to polarization along the pure y direction, Ray 3 also includes a component of polarization along the z direction. When subsequently reflected from a reflective imager, as shown in FIG. 18, the reflection plane for resulting Ray 3" is no longer the same as it was for Ray 3'. Because the polarization vector of Ray 3" has not been affected by reflection, this rotation of the reflection plane means that the Ray 3" is no longer purely s polarized, but is now partially p polarized. This gives rise to an effective depolarization due to reflection which we will refer to as part of a "depolarization cascade". The depolarization effect is further considered below, after first analyzing the differences in how MacNeille and Cartesian PBS's polarize incident light.

FIGS. 13–20 better illustrate the reflection of a Ray 1, the principal ray, and of the vertically skewed Ray 3 off a PBS. After reflection from the PBS, the x and z axes rotate about the y axis to keep the z axis aligned with the propagation direction of the principal ray. The rotated axes are labeled x', y' and z' and the reflected rays are labeled Ray 1' and Ray 3' respectively.

Referring to FIGS. 13–20, the principal Ray 1, shown by the solid vector, propagates in the z direction. FIGS. 13–16 illustrate the paths of Rays 1 and 3 when reflected off a PBS 74. The PBS 74 comprises a cube 76, shown in dashed lines, having a PBS surface 78 located along an internal diagonal plane of the cube. The cube has an incident face 80 that receives the incident light rays and an exit face 458 through which the rays reflected off the PBS surface exit the cube.

Figure 13:
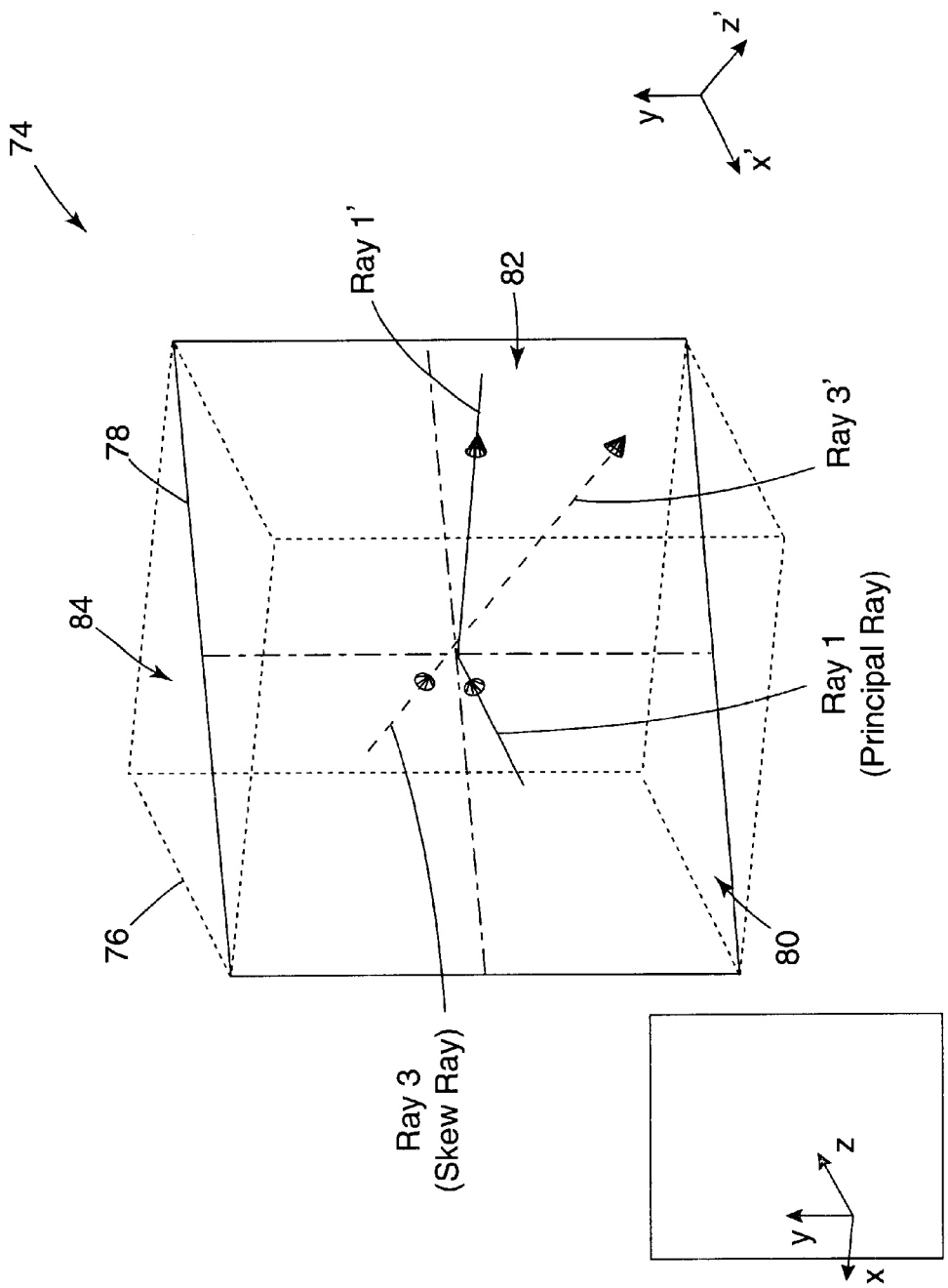
FIG. 13 is an isometric view of the incident side of a PBS illustrating the paths of a principal ray and a vertically skewed ray.
Figure 14:
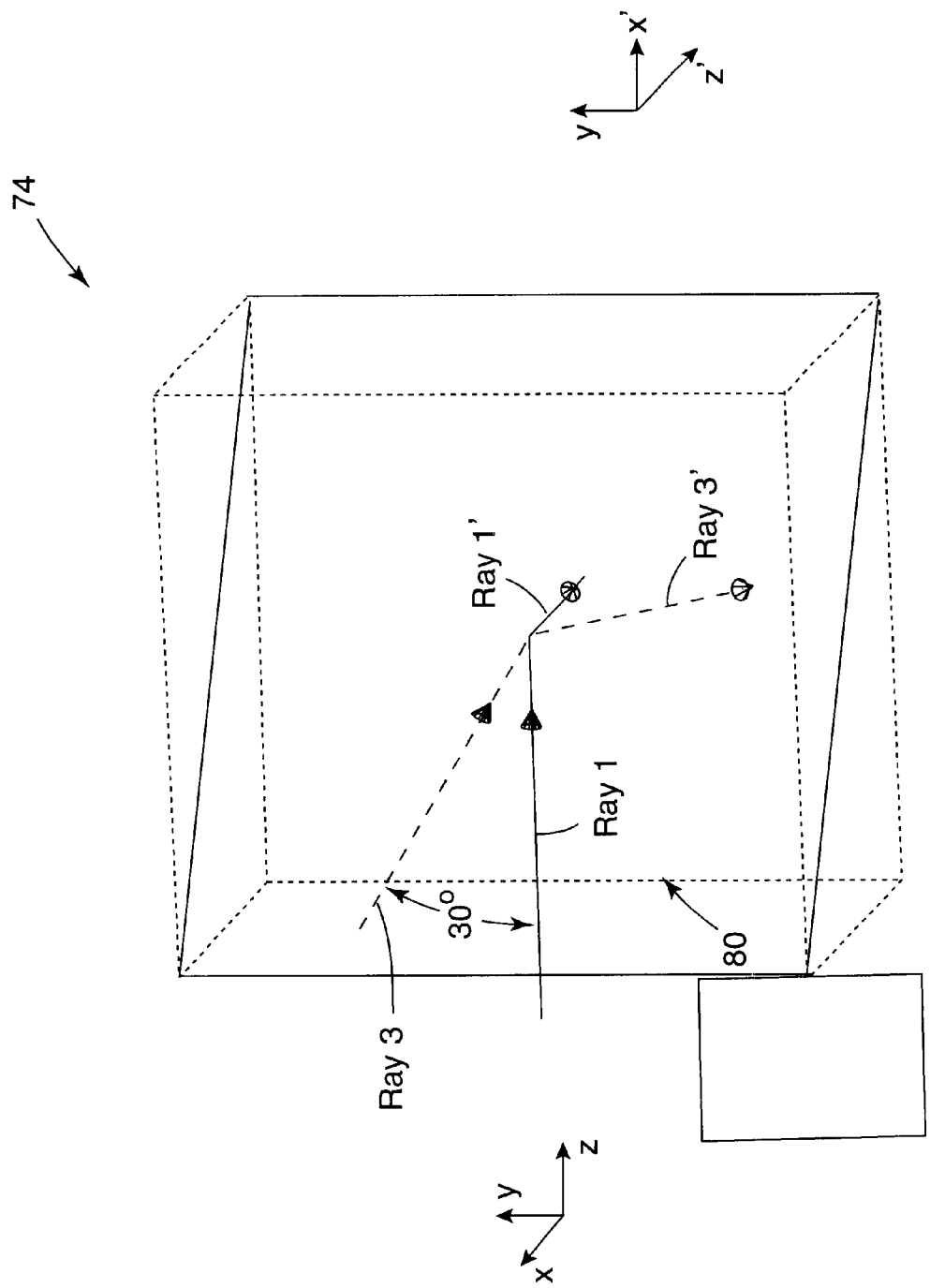
FIG. 14 is an isometric view of the exit side of the PBS illustrated in FIG. 13 showing the paths of the same rays.
Figure 15:
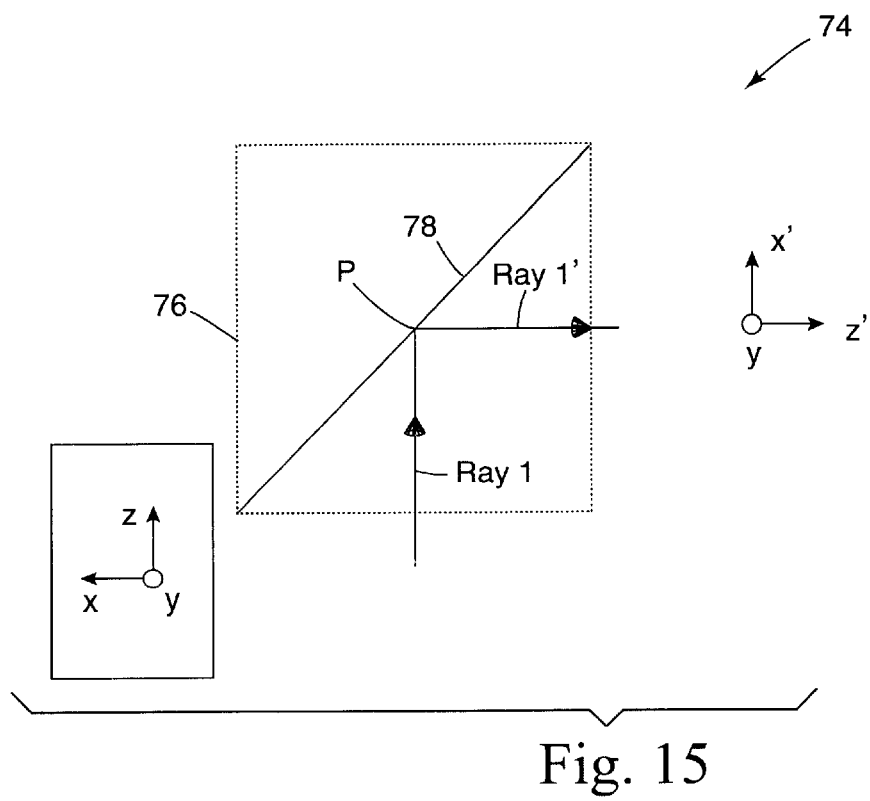
FIG. 15 is a top plan view of the PBS illustrated in FIG. 13 showing the paths of the same rays.
Figure 16:
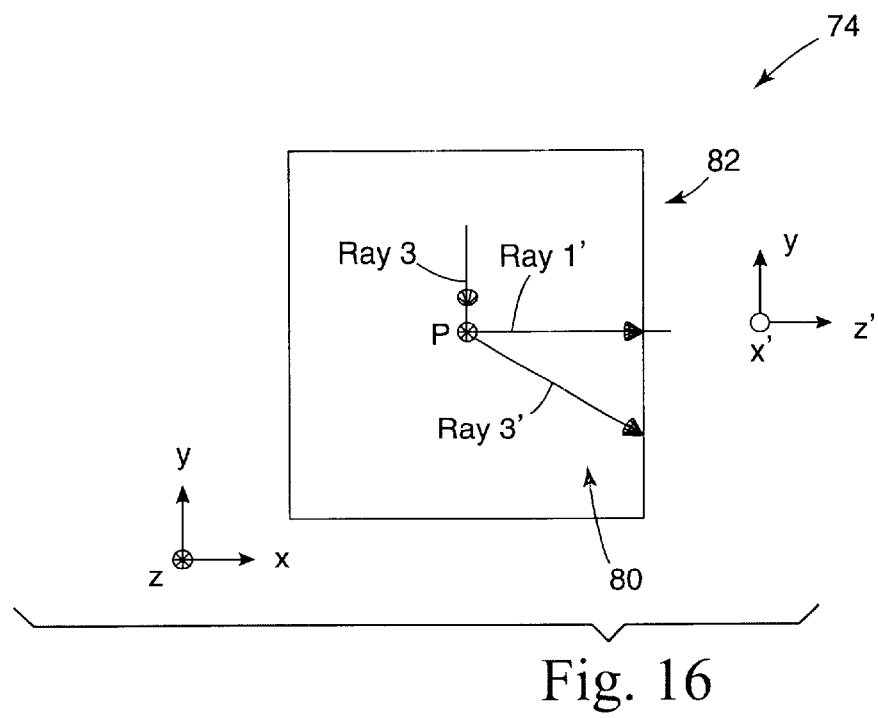
FIG. 16 is an elevation view of the incident side the PBS illustrated FIG. 13 showing the paths of the same rays.

FIG. 13 is an incident side perspective view and FIG. 14 is an exit side perspective view. FIG. 15 is a plan top view of a top face 84 and FIG. 16 is an incident side elevation view of the PBS 74. Ray 3, shown by the dash-dot-dot vector, propagates at a 30° angle with respect to Ray 1 along the y-z plane. Ray 1 also is contained in the same y-z vertical plane. For illustrative purposes, both rays have been illustrated as having the same point of contact P on the surface of the PBS 74, marked by the intersection of perpendicular dot-dash axes. Upon reflection from the PBS 74, the Ray 1' propagates in the negative x (z') direction, while Ray 3' deviates 30° in the x-y (_y, z') plane.

Figure 17:
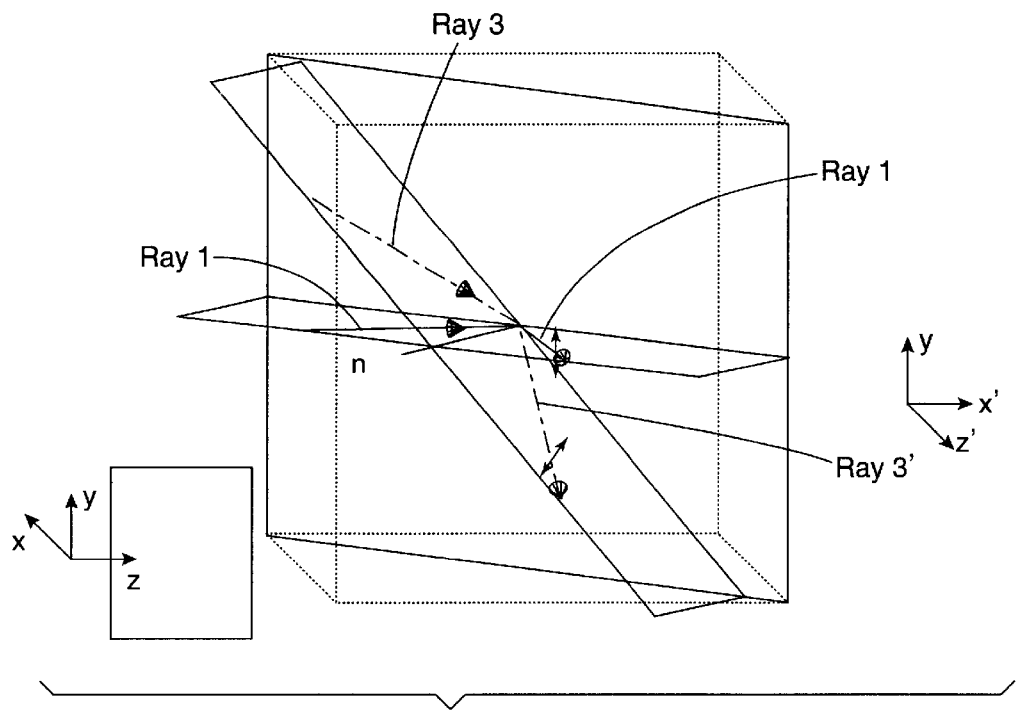
FIG. 17 is an isometric view of the exit side of a MacNeille PBS illustrating ray paths and polarization of the reflected rays.

FIG. 17 is the equivalent of FIG. 14 for a system including a traditional MacNeille PBS, and also indicates the effects of reflection on the polarization state of initially unpolarized rays of light, 1 and 3. The polarization states of the reflected components of Rays 1' and 3' are illustrated by small direction of arrows. The reflective surface normal is shown as â. It may be appreciated that the s-polarization states of both Ray 1 and Ray 3 are reflected. However, since traditional reflective polarizers operate based on the plane of incidence of the incoming rays, the reflected polarization states for Ray 1' and Ray 3' each are perpendicular to the plane of incidence for each respective ray. Accordingly, after reflection from the MacNeille PBS, the polarization state of the Ray 3' is rotated away from the y, z' plane, as illustrated in FIG. 17. That is, in a system including a traditional MacNeille polarizer, the reflection of a vertically skewed ray is depolarized with respect to the reflection of the principal ray. The larger the skew angle, the larger will be the depolarization effect. For a skew angle of 30°, the depolarization effect is a 39.2° rotation of the reflection plane, and consequently of the polarization state of s polarized light from the desired y, z' plane.

Figure 19:
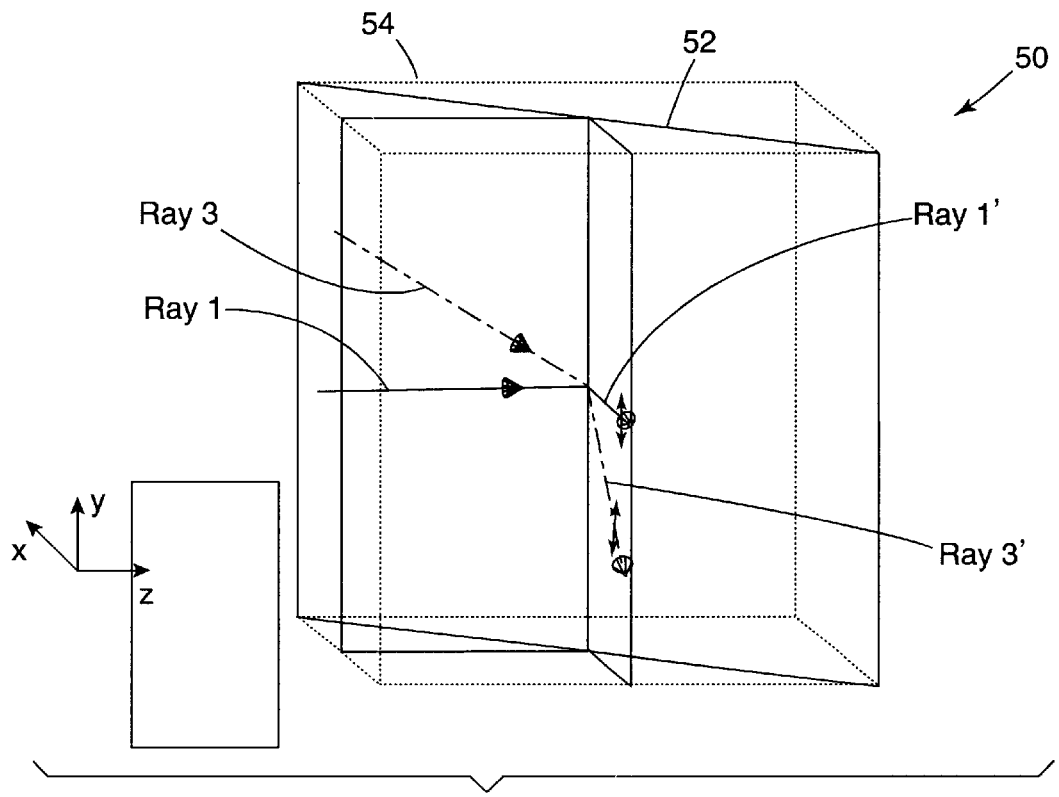
FIG. 19 is an isometric view of the exit side of the Cartesian PBS illustrated in FIG. 2 showing ray paths and polarization of the reflected rays.

In contrast with FIG. 17, FIG. 19 illustrates the reflection (Rays 1' and 3') of both unpolarized Ray 1 and Ray 3 off the Cartesian PBS 50 of display system 10. The Cartesian PBS 50 has a fixed vertical reflection axis. The Cartesian PBS 50 includes a 3M advanced multi-layer birefringent film, or other suitable Cartesian PBS, such as a wire grid polarizer, or any other Cartesian polarizer PBS.

FIG. 18 illustrates in simplified detail the reflection of Ray 3' off the PBS 74 and the subsequent reflection, Ray 3", off a reflective imager 86. In the present model, a mirror is used as an ideal imager to avoid the contrast degradation associated with imager performance factors, such as diffraction and scattering due to pixelation or stray retardation in the imager dark state. A mirror does not rotate the polarization state of the light and represents the function of an ideal reflective LCD imager for most nematic modes in the dark state.

The depolarization effect illustrated in FIG. 12 is amplified when the Ray 3" is reflected off the imager 86.

Quantitatively, if the polarization state of Ray 3' deviates by an angle θ from the y-z' plane, then the polarization vector of the Ray 3" returning from the mirror-like imager will be at an angle 2θ from the s polarization condition, thus suffering from a depolarization cascade. This purely geometrical effect arising from the rotation of the reflection plane results in the mirrored Ray 3" possessing a p component which will leak through the MacNeille PBS, degrading contrast in the dark state for the system. The depolarization cascade problem will be aggravated further by the presence of other tilted reflective surfaces, such as color separation surfaces placed between the PBS and the imager, as described in Rosenbluth, Contrast Properties. A detailed treatment of the skew-ray depolarization arguments also may be found in Alan E. Rosenbluth et al., "Contrast Losses in Projection Display from Depolarization by Tilted Beam Splitter Coatings" 1997 International Display Research Conference, pp. 226–9 (hereinafter "Rosenbluth IDRC"), and, in Rosenbluth Contrast Properties, relevant portions of both of which are hereby incorporated by reference.

Rosenbluth Contrast Properties also mentions a method to compensate the depolarization by placing an additional component, a ¼ wave retarder plate, parallel or perpendicular to the polarization direction of the principal ray. However, at low f/#'s, there occurs an amplification of the depolarization induced by the PBS due to skew rays reflected off other inclined surfaces, such as those that separate and recombine the color components of the light. Rosenbluth discourages the use of reflective interference coatings by indicating that "Beam-dividing interference coatings give rise to polarization crosstalk via compound-angle depolarization, as illustrated . . . for a PBS coating . . . . The depolarization gives rise to undesired intensity in the dark stage image, causing contrast to degrade proportional to $NA^{-2}$". See, Rosenbluth Contrast Properties, pp. 383–84. Rosenbluth further states that "typical requirements of contrast >100:1 limits NA to ~0.15 [f/3.3] for a PBS/TNLC module operating without quarter-wave retarder". See, Rosenbluth Contrast Properties, p. 382. Accordingly, Rosenbluth recognizes that the "depolarization cascade" effect of traditional polarizers effectively limits the f/# of MacNeille PBS based projectors to be greater than about 3.3, thereby limiting the light throughput efficiency of these systems.

In general, the Cartesian polarizer 50 reflects light that is y polarized and transmits light that is x-polarized. As seen in FIG. 19, this is true even for unpolarized light. Since the Cartesian PBS 50 has a fixed reflection axis that is intrinsic to the material of the PBS and not dependent on the angle of incidence of the light rays, the polarization of an initially y polarized Ray 3 when reflected as skew Ray 3' is not significantly rotated with respect to that of the reflected principal Ray 1'. The polarization state of the reflected Ray 3' is restricted to lie in the y-z' plane containing the reflected ray and the vertical axis of the PBS 50. The reflected Ray 3' has no substantial x' component.

Accordingly, y polarized light is presented to subsequent inclined reflecting surfaces regardless of the incident angle of the skew rays. While the reflecting surfaces may introduce some depolarization of their own, the reflecting surfaces will not amplify the pre-existing depolarization of the ray, since that depolarization will not exist or be minimal. This effect both ensures that the LCD imager is presented with a ray that is nearly purely y-polarized, and will minimize the degree of rotation introduced prior to reaching the imager.

In the case where Ray 3' is reflected off the Cartesian PBS 50, the depolarization cascade and the contrast degradation described in relation to FIGS. 12 and 18 does not occur. A Cartesian PBS does not require or benefit from incident light being in an s polarization state.

The present invention enables optical imaging system embodiments that may utilize light rays having a very wide range of angles of incidence. Optical systems in accordance with the present invention have illumination optics having f/#s lower than 2.5, with acceptable system contrast. Acceptable contrast is defined as at least 100:1 over all color bands of interest in projection systems using a reflective mirror as an ideal imager. The system 10 of the present invention including the Cartesian polarizer 50 has been experimentally tested with illumination optics having a lens speed of f/1.8, while providing a contrast ratio of over 200:1.

In summary, optical systems according to the present invention minimize depolarization by the use of the Cartesian, as opposed to MacNeille PBS. By understanding and minimizing the depolarization effect, the present invention allows the use of optics having extremely low f/#'s.

The system of the present invention provides further benefits for skew rays that are both vertically and horizontally angled with respect to the principal ray. Referring back to FIG. 12, Ray 4 is both vertically and horizontally angularly displaced. The polarization vector for Ray 4 contains components in the x direction as well as in y and z. All of the depolarization effects described for a reflected Ray 3' will occur upon a reflected Ray 4' in a system including a traditional "plane-of-incidence" dependent polarizer. In addition, an LCD imager will be presented with an additional component of x' polarized light along with the dominant y polarization. The depolarized component will be amplified upon reflection from subsequent inclined reflecting surfaces, such as a MacNeille PBS or color-separating surface. The amplified depolarization component will cause the same degradation in the dark state as for rays of type 3. In addition to this effect, because the imagers are usually optimized to perform well with only one polarization of light, there may be additional contrast degradation due to the presence of the x' polarized component in the light from the MacNeille PBS.

The optical imaging system of the present invention using Cartesian PBS's, on the other hand, generally will not reflect the x component of polarization at all, and will therefore provide superior performance.

The present invention further discloses additional advantages to the use of reflective Cartesian polarizers in a projection system. As shown in the illustrated embodiments, the Cartesian polarizers may be oriented at arbitrary angles of incidence or be shaped to minimize volume, achieve keystone correction, or otherwise optimize the performance of the projection system. In one exemplary embodiment, the Cartesian PBS is oriented at an angle between 40° and 50° with respect to the principal ray.

Figure 20:
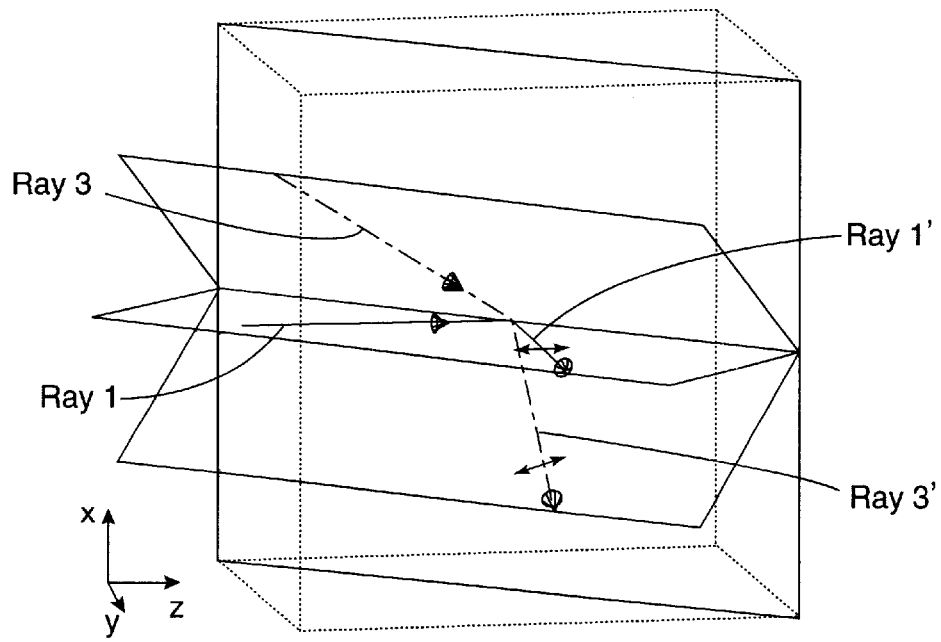
FIG. 20 is a perspective view of the exit side of a rotated Cartesian PBS showing ray paths and the polarization of reflected rays.

As the PBS 50 has a set polarization axis, orientation of the PBS 50 is important. FIG. 20 shows the polarization direction of Rays 1' and 3' if the PBS 50 is rotated 90° about the surface normal. The PBS reflection Material Axis is now horizontal instead of vertical. In this case, the polarization state suffers a similar but opposite rotation as that for the MacNeille PBS of FIG. 17. For better results, it is preferable that the polarization direction be perpendicular to the propagation direction of Ray 3', $k_3$, and contained in the plane defined by the reflection Material Axis and $k_3$. The rotation of the polarization state of Ray 3' with respect to Ray 1' is shown in FIG. 20.

Figure 24:
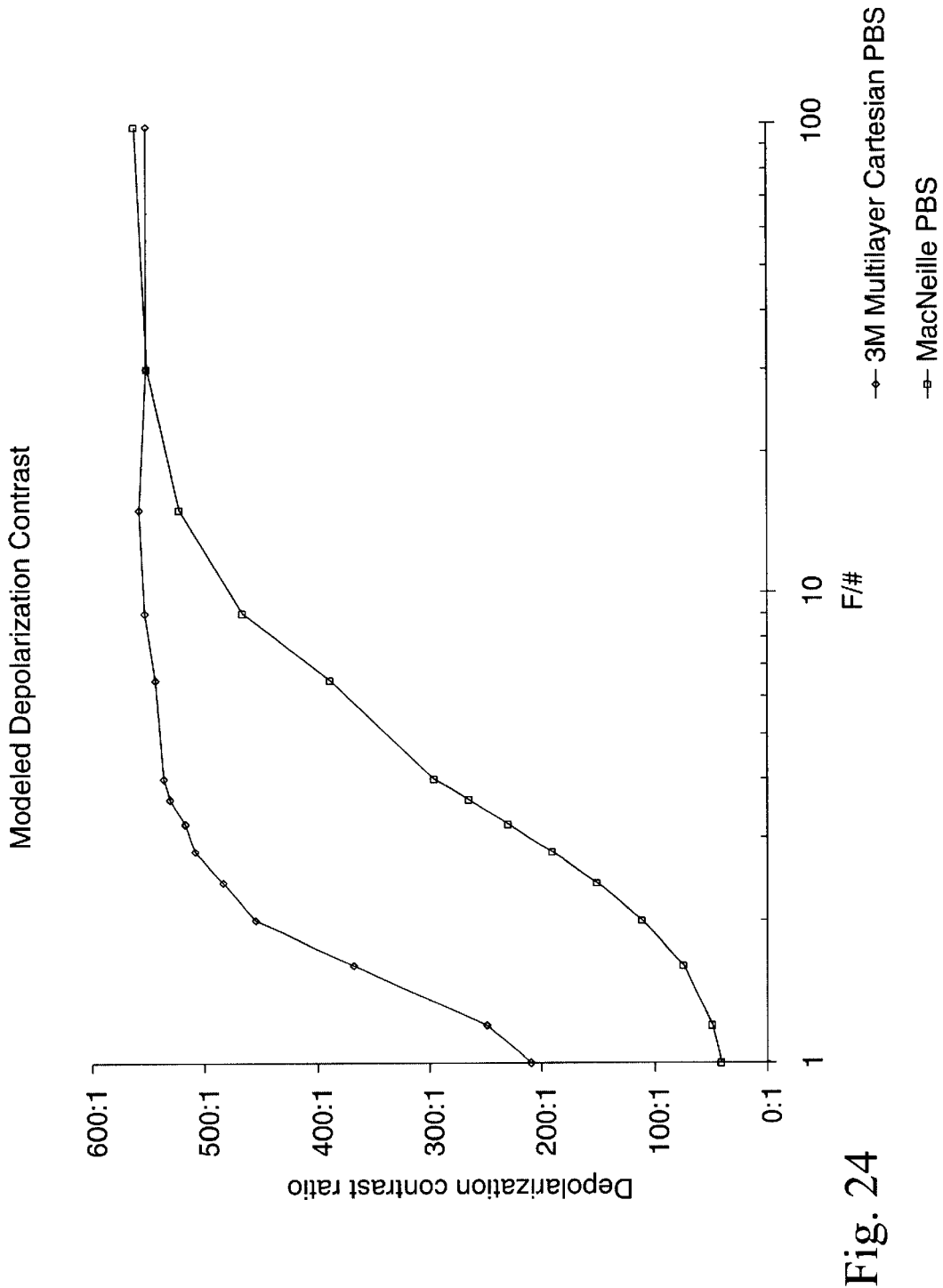
FIG. 24 is a graph of modeled depolarization contract ratio versus f/# for optical imaging systems using a 3M advanced film Cartesian PBS and a MacNeille PBS.
Figure 25:
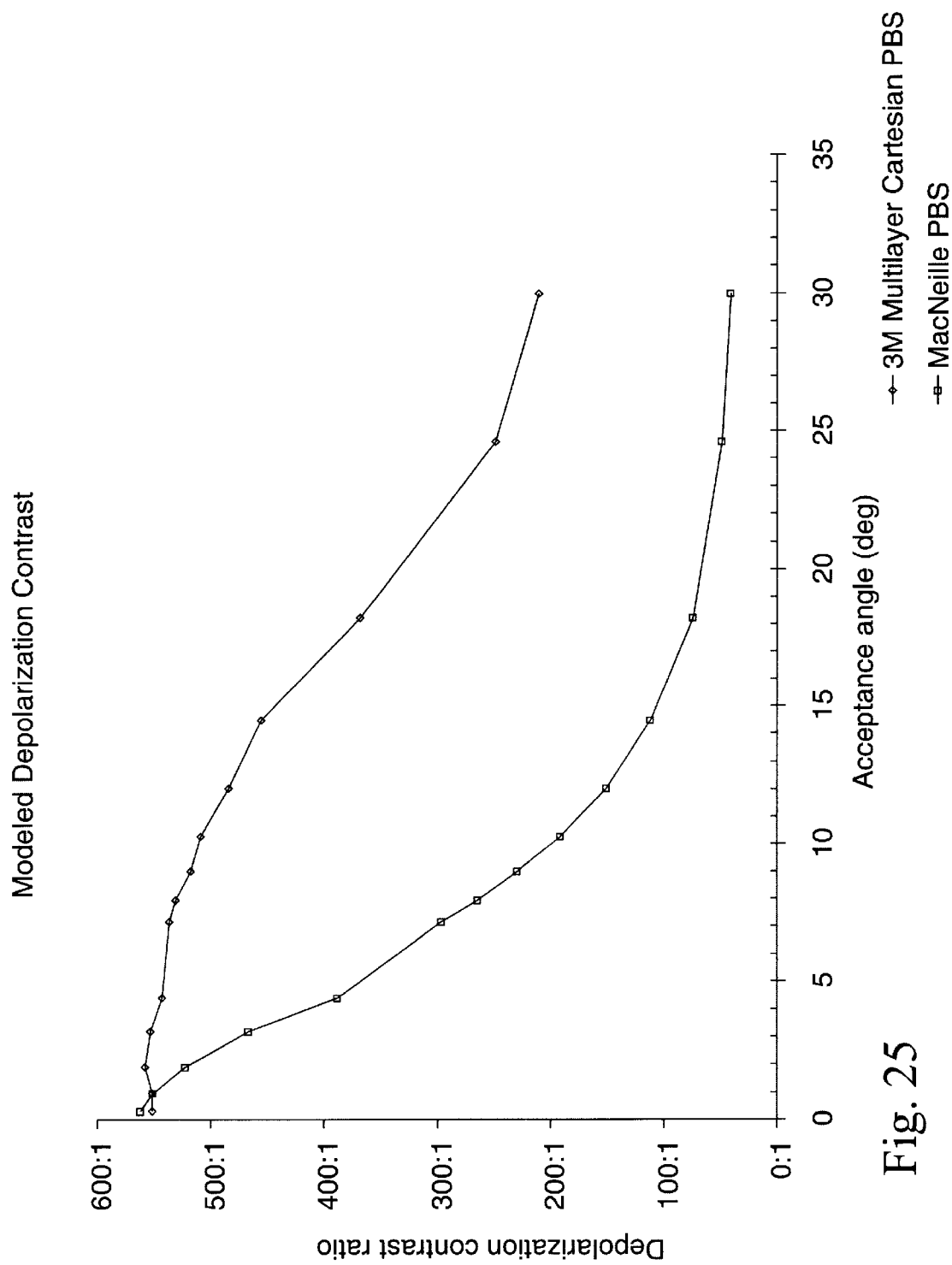
FIG. 25 is a graph of modeled depolarization contrast ratio versus acceptance angle for optical imaging systems using a 3M multilayer polymeric Cartesian PBS and a MacNeille PBS.

FIGS. 24 and 25 illustrate the results of a computer modeling of depolarization contrast ratio vs f/# and acceptance angle for traditional PBS systems and the exemplary 3M Film Cartesian PBS 50. It may be noted that the Cartesian PBS Systems in accordance with the present invention provide far better contrast ratio at lower f/#'s and wider acceptance angles.

The advantages of the present invention may be better understood in light of the following examples.

EXAMPLE 1

Performance of a Projection System Test Bed with Fiber Light Illumination

To understand the best ways for utilizing Cartesian polarizers in a folded light path, reflective imager configuration, two types of imagers, FLCD based imagers and Nematic based imagers, were considered separately.

A compact and cost-effective LCD projector configuration using reflective LC microdisplays for which the PBS serves as both polarizer and analyzer, is depicted in FIG. 2. A projection display test bed implementation of FIG. 2 was built and used to compare the performance of a system in accordance with the present invention. A first system was tested including a wide-angle Cartesian PBS, while a second system was tested employing a high-performance Brewster's angle PBS. A 3M multi-layer polymeric PBS film laminated between two 0.3 mm or two 0.7 mm glass sheets was used as a representative wide angle Cartesian PBS. A high-performance MacNeille PBS high extinction cube, such as those available from Balzers Thin Film, Inc from Golden, Colo., was used as the Brewster's angle PBS.

The performance of the MacNeille PBS cube is summarized below.

TABLE 1

| | High Extinction |
|---|---|
| Design f/# | f/2.5 |
| Extinction | 500:1 |
| Material | SF2 |
| Size | 32 mm × 32 mm × 32 mm * 0.25 mm |
| Clear aperture | 30 mm × 30 mm |

PBS components were tested in an optical imaging system having illumination optics between f/1.8 and f/8.0, first with fiber light illumination. The illumination profile of fiber light illumination varies smoothly, was nearly Lambertian and did not uniformly illuminate the imager.

To avoid variables due to non-ideal performance of the imagers used, the effects of the reflective imager were modeled by replacing the imager with a ¼ wave film, such as quarter-wave film from Edmund Scientific from Barrington, N.J., laminated to a front surface mirror. When the optic axis of the film is rotated 45° to the input polarization, a bright image was projected to the screen. A dark state occurred when the ¼ wave film was removed and a bare aluminum mirror was placed at the imager location. The arrangement modeled LC modes that vertically turn the LC to the optic axis, such as TN or VAN (vertically aligned nematic) modes. An alternate dark state occurred when the ¼-wave film was left in the system but rotated such that the optic axis of the film was turned parallel (or perpendicular) to the input polarization. The alternate arrangement modeled LC modes that have a retarder in such an orientation, such as FLC imagers or ideal imagers functioning in the above modes with a ¼-wave compensation film over the imager.

Typically, contrast measurements are made by measuring light throughput at nine locations on the projection screen for both the dark and light states, then calculating the ratio of these measurements. The ratio is referred to as the contrast dynamic range. The contrast dynamic range is one measurement of the contrast ratio. The contrast dynamic range ratio is defined as the projected light throughput in the brightest state divided by the light throughput in the darkest state. Because, as indicated above, the fiber light does not uniformly illuminate the imager, a single-point measurements at the center of the screen, where the light is brightest, was used for the fiber illumination case. Contrast dynamic range results should therefore be understood to be either single point values at the center of the screen for fiber illumination, or nine point averages in all other cases.

For the case of a bare mirror dark state under fiber illumination dynamic ranges and light throughput vs. f/# were measured. The wide-angle Cartesian PBS had significantly better contrast performance at low f/#'s than the MacNeille cubes.

TABLE 2

System Dynamic Range and Throughput in Fiber Illumination (Bare Mirror Dark State)

| f/# | Wide-angle Cartesian Flux (lm) | Wide-angle Cartesian Dynamic Range | MacNeille Flux (lm) | MacNeille Dynamic Range |
|---|---|---|---|---|
| 1.8 | 232.1 | 211:1 | 241.0 | 38:1 |
| 2.0 | 222.6 | 219:1 | 227.0 | 41:1 |
| 2.4 | 194.0 | 251:1 | 193.0 | 53:1 |
| 2.8 | 149.4 | 306:1 | 151.0 | 69:1 |
| 3.3 | 112.3 | 393:1 | 114.0 | 96:1 |
| 4.0 | 80.6 | 507:1 | 82.5 | 135:1 |
| 4.7 | 56.3 | 590:1 | 57.7 | 186:1 |
| 5.6 | 38.7 | 608:1 | 40.2 | 236:1 |
| 6.7 | 27.4 | 863:1 | 27.9 | 279:1 |
| 8.0 | 18.7 | 884:1 | 19.9 | 398:1 |

Separation of the performance into color bands is preferable, however, such separation did not prove possible to do with fiber illumination due to the low available light levels, especially in the blue spectrum. The term color bands refers to wavelength bands into which white light is separated for independent modulation, prior to being recombined into a colored image. These bands are typically less than 100 nm wide, for example 50–70 nm, and are often selected so as not to include light which is detrimental to color gamut, such as yellow and cyan light in a three-band, red/green/blue image forming system. While the exemplary data in Table 2 does not explicitly demonstrate separate red, green, and blue contrast levels exceeding 100:1 for the system of the present invention, the Tables below illustrates contrast levels exceeding 100:1 for other illumination sources. It is clear though, that for quasi-lambertian white light contrast the Cartesian PBS is markedly superior to the MacNeille PBS.

While the measured throughput was similar for the MacNeille and wide-angle Cartesian systems, it should be noted that the wide-angle Cartesian PBS did not include an anti-reflection coating, while the MacNeille PBS was antireflected. From measured transmission vs. angle data, it is expected that the potential for improved throughput will be better for the 3M multi-layer polymeric films.

The qualitative performance of the different optical imaging systems also was probed by projecting the pupil of the projection lens onto the screen. Such projection maps angles of incidence into locations on the screen. Conoscopic contrast plots are photopically averaged representations of the pupil images. A digital camera was used to image the pupils. The resulting projections are illustrated in FIGS. 21–23.

Figure 21:
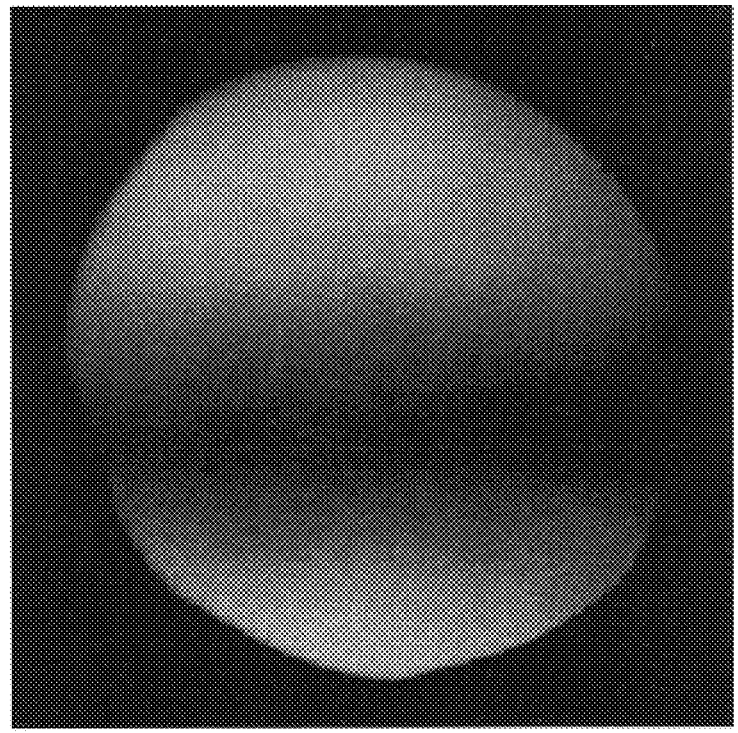
FIG. 21 is a projection of a pupil image of an optical imaging system including a 3M DBEF sheet used as a PBS.
Figure 22:
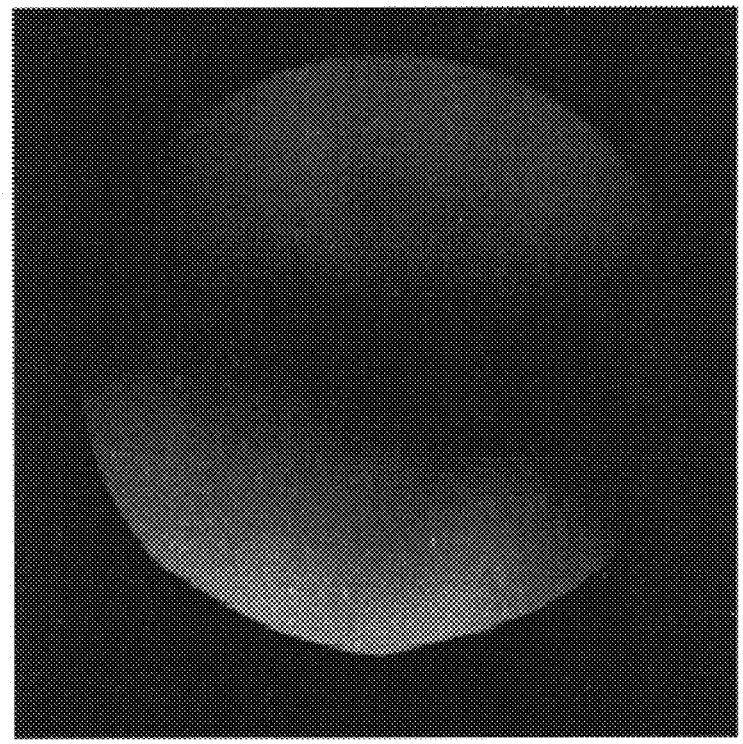
FIG. 22 is a projection of a pupil image of an optical imaging system including a MacNeille PBS.
Figure 23:
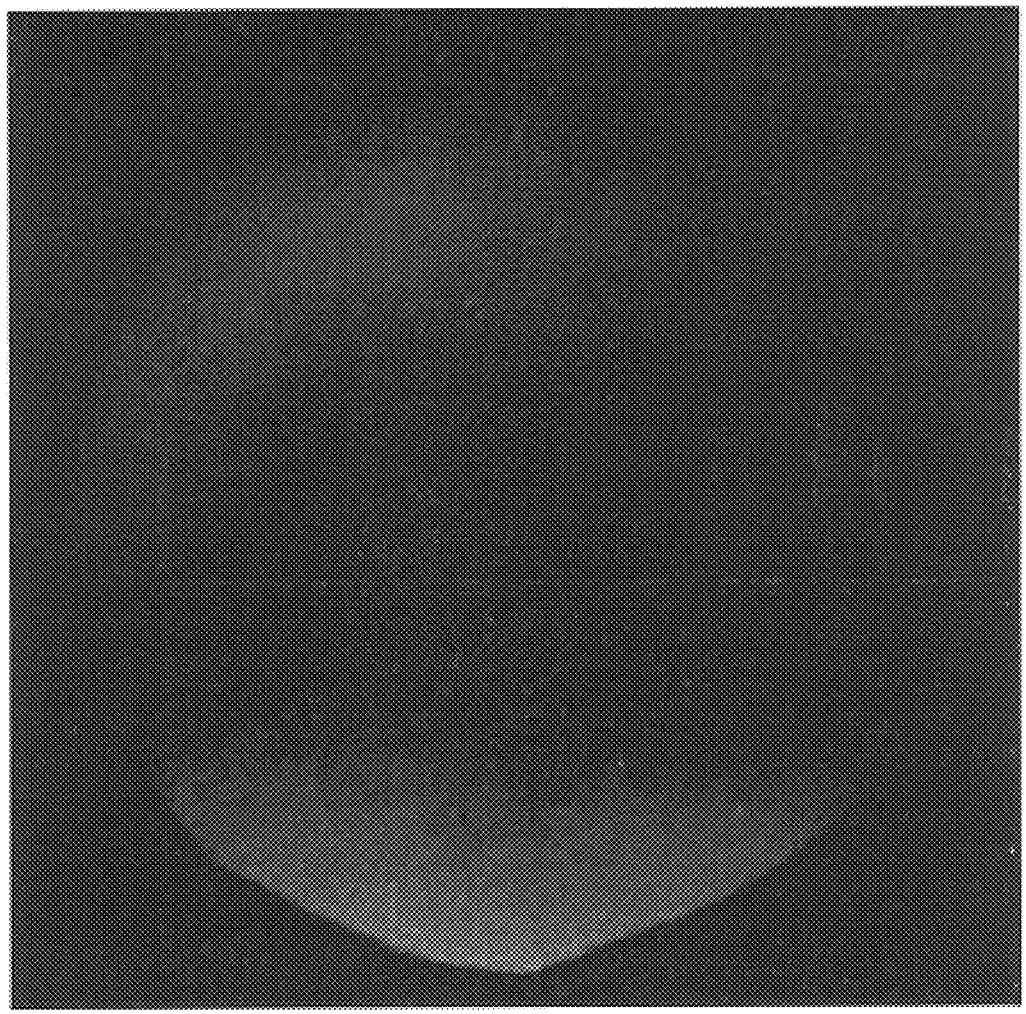
FIG. 23 is a projection of a pupil image of an optical imaging system in accordance with the current invention including the wide-angle Cartesian PBS.

FIGS. 21–23 depict the dark state light present at the pupil of the f/2 projection lens after passing through the projector test bed of FIG. 2, including pre- and post-polarizers. At the pupil of the projection lens light is spatially sorted by angle. Therefore, these images are depictions of conoscopic plots of the dark state light transmission vs. angle of incidence. These images may be compared to FIGS. 32–34, which are calculated contrast results. For these results, which will be described more fully below, a quarter wave film was used to provide a bright state for calculating contrast ratios, and a mirror was used to represent the dark state depicted in the figures. The images of FIGS. 21–23 were taken with a digital camera that adjusted its gain automatically to provide good image quality; otherwise all images were taken under identical conditions. Because the camera adjusts gain, these images can only be used qualitatively. Full screen contrast values associated with each image will be provided below for comparison.

FIG. 22 depicts the dark state performance of a MacNeille polarizer. In a color depiction is it notably red along the left hand side, corresponding to light incident on the PBS coating at angles closer to normal than 45°. It has a quite deep Maltese band of good contrast, but the band is also quite narrow and the type 3 and 4 skew rays, present at the top and bottom of the image, cause a notable increase in brightness. The white contrast on screen associated with this pupil image is 53:1, however the contrast over a particular color band may be lower than this due to the observed red leak.

FIG. 21 shows the pupil image for a dark state of the exemplary system using 3M DBEF. This image has a much less dark, but broader, Maltese band. As projected on the screen, there was a slight red coloration in vertical bands across the image, as well as a pronounced blue/green coloration to the Maltese band, especially on the left hand side of the band. This redness is less pronounced than for the MacNeille PBS. The broader Maltese band and the reduced skew ray leakage that can be seen for this polarizer are expected, since it is a Cartesian polarizer. The reason the performance is inadequate is that the polarizer has not been designed for high extinction. This is evident in the brightness of its Maltese band relative to that of the MacNeille PBS. The white light contrast measured with this DBEF PBS was 95:1, however this contrast was not uniform across the entire visible band. In order to demonstrate this, efforts were made in this case to measure red, green and blue color band contrast for this particular sample, despite the low light levels. Red band contrast for this DBEF PBS was measured at 104:1, green band contrast at 94:1, and blue band contrast at 79:1. This DBEF PBS would therefore not be an acceptable PBS for high contrast projection purposes. Finally, FIG. 23 shows the dark state performance of the 3M Multilayer polymeric PBS. The overall darkness of the image is striking, despite the automatic gain adjustment of the camera. The width of the Maltese band is much broader than for either the MacNeille PBS or the DBEF PBS, and the leakage of type 3 and 4 rays is much less severe than in either of the other cases. The white light contrast measured with this PBS was 222:1. Color band contrast for this PBS will be described more fully in Example 2.

FIGS. 31–35 present results that further and more quantitatively illustrate how a Cartesian polarizer optical imaging system improves performance of the illumination leg of a projection system. A computer code was used to model the transmission or reflection of a Stokes vector from surfaces or multilayer stacks. Luminous intensities for the various polarization states were obtained by weighting the result at each wavelength with the value of the CIE 1931 photopic response function and the radiance of an equal-energy Lambertian illuminant and integrating over all wavelengths from 400 to 700 nm. In this manner results such as polarization state and contrast ratio were obtained for each ray in a conical bundle. To present this data, FIGS. 31–35 depict conoscopic plots.

A conoscopic plot presents data that vary with the polar coordinate angles, $\theta$ and $\phi$ by using a two-dimensional polar coordinate system with $\theta$ as the radial coordinate. This maps the upper hemisphere onto a disc and plots data along rings of constant $\theta$ and rays of constant $\phi$. Conoscopic plots are commonly used to depict the angular performance of devices such as liquid crystal displays through a plot of angular contrast ratio, i.e. contrast ratio (CR) versus viewing angle. One forms the ratio of light state to dark state luminosity for rays at several angles and plots the contours of constant CR conoscopically. A technique to plot sets of polarization data conoscopically also was developed.

Figure 31:
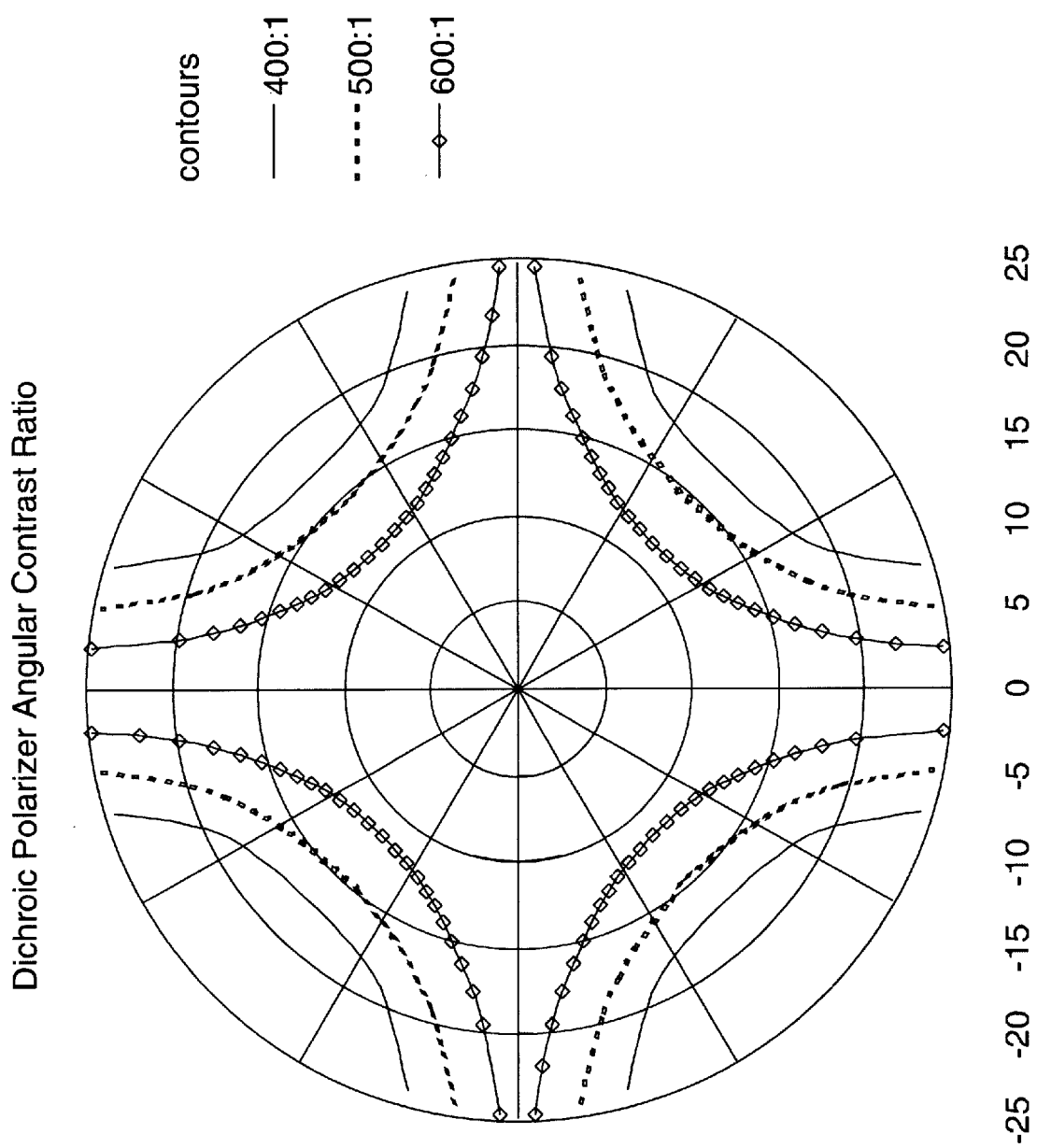
FIG. 31 is a conoscopic contrast ratio contour plot for a vertically-oriented linear polarizer, analyzed with a second, identical polarizer lying in a plane parallel to the first.

FIG. 31 shows a conoscopic CR contour plot computed for a vertical or Y-oriented linear polarizer lying in the X-Y plane and analyzed with a second, identical polarizer lying in a plane parallel to the first. (Polarizer orientation is used to refer to the orientation of its transmission axis.) The light state occurred when the analyzer was oriented parallel to the Y-axis and the dark state when the analyzer was perpendicular to it. The distinctive pattern is referred to as a Maltese cross, with the high contrast regions about the principal planes, defined by $\phi=0, 180°$ and $\phi=\pm 90°$, forming the dark arms of the cross. Since the variation of light state luminosity with angle is typically rather small the regions of high angular CR are also very dark. In this case similarity to an actual Maltese cross is slight due to the small range of angles. For $\theta \geq 60°$ it is much greater.

One can also use a conoscopic format to present large amounts of angle-dependent polarization data on a single plot. A common way to describe the polarization state of a light ray is with its polarization ellipse, i.e. the curve swept out by the end point of the electric field vector over a period of oscillation. The ellipse graphically displays the magnitude and orientation of the polarization state of the light ray with respect to a pair of orthogonal reference axes lying in a plane perpendicular to the ray direction. Important special cases include circular polarization (where the ellipse becomes a circle) and linear polarization (where the ellipse degenerates into a straight line).

For any $\theta$ and $\phi$ a polarization ellipse in the local S-P coordinate system defined by $\theta$ and $\phi$ can be rotated (by $-\phi$) and plotted in a global X-Y coordinate system. This transformation allows one to present several angle-dependent polarization data sets with a single common reference. For example, plotted this way a narrow vertical ellipse would indicate a nearly linear polarization in the Y-Z plane. Note that linear polarization parallel to the Y-axis is a special case that occurs for $\theta=0$ or when $\phi=0$ or $180°$, for it is only in these cases that the Y-axis actually lies in a plane perpendicular to the ray direction. A similar interpretation follows for the case of a narrow horizontal ellipse. A refinement of this technique weights the size of an ellipse by the degree of polarization (DP) of the light. (The DP is that fraction of total light intensity in a well-defined polarization state. Natural light is randomly polarized and has DP≈0.)

Figure 26:
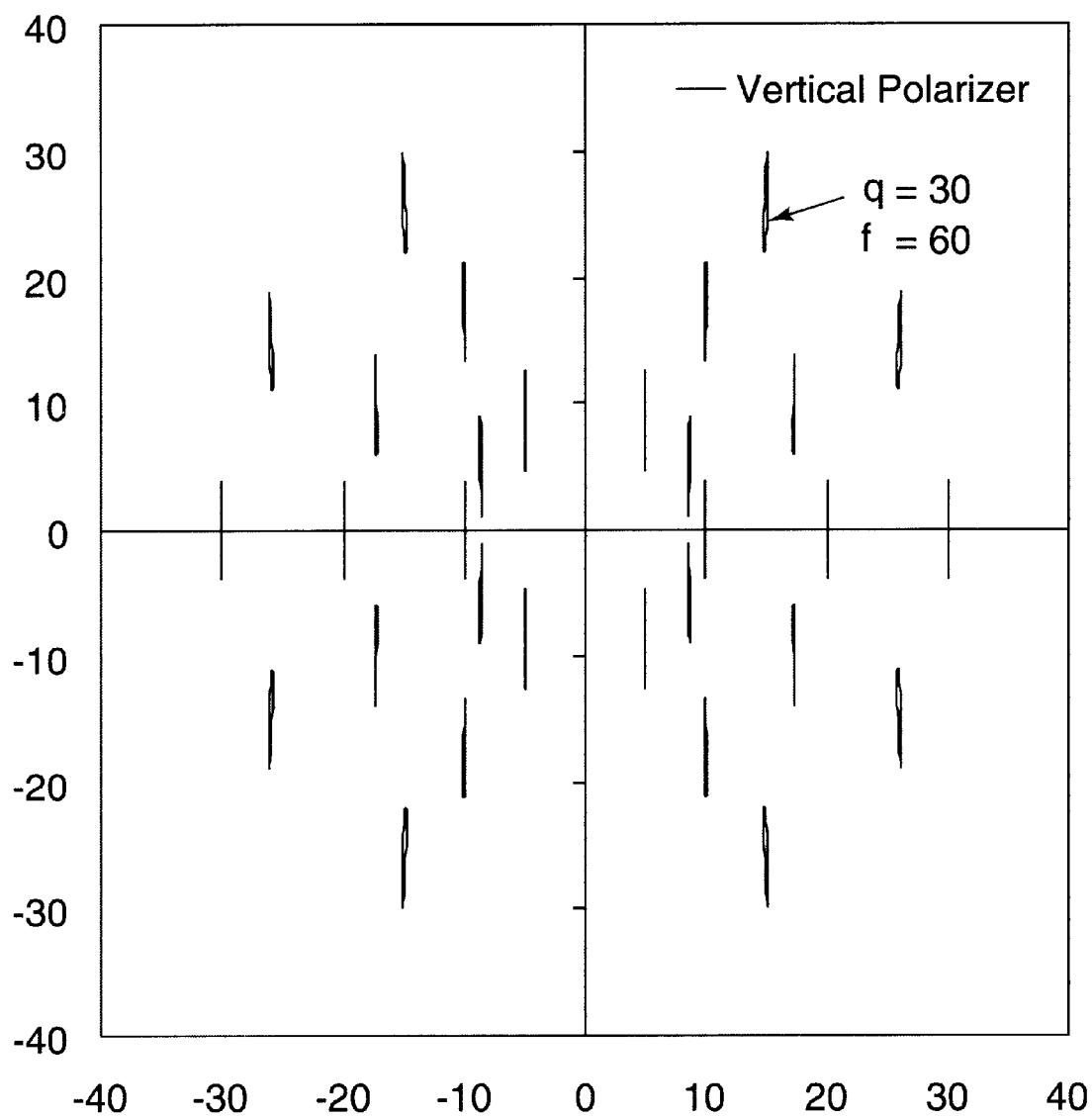
FIG. 26 is a conoscopic chart of the state of polarization of initially unpolarized light after passing through a linear absorptive polarizer.

FIG. 26 shows the computed polarization states of initially unpolarized light rays passed through a vertical or Y-directed polarizer along the angles $\theta=0, 10°, 20°, 30°$ and $\phi=0, 30°\ldots 330°$. The ellipse at $\theta=30°$ and $\phi=60°$ has been specifically indicated. This model is for a typical high quality linear polarizer so the ellipses are essentially vertical lines. Notice, however, that at large angles of incidence away from the principal planes there is a slight rotation of the ellipses away from vertical. (The effect is quite noticeable for $\theta>50°$.) Light coming out of the polarizer along those directions is less vertically and more horizontally polarized than light propagating in other directions. This is the source of the Maltese cross. The ellipse pattern for a crossed (horizontal or X-directed) polarizer would be identical to FIG. 26 rotated by 90°. Within the principal planes the ellipses for the crossed polarizers would be orthogonal and light will be blocked from passing through along these directions. At large incidence angles and away from the principal planes the ellipses for the two polarizers are no longer orthogonal (in fact they are rotated in opposite directions) which indicates that light must leak through.

Figure 34:
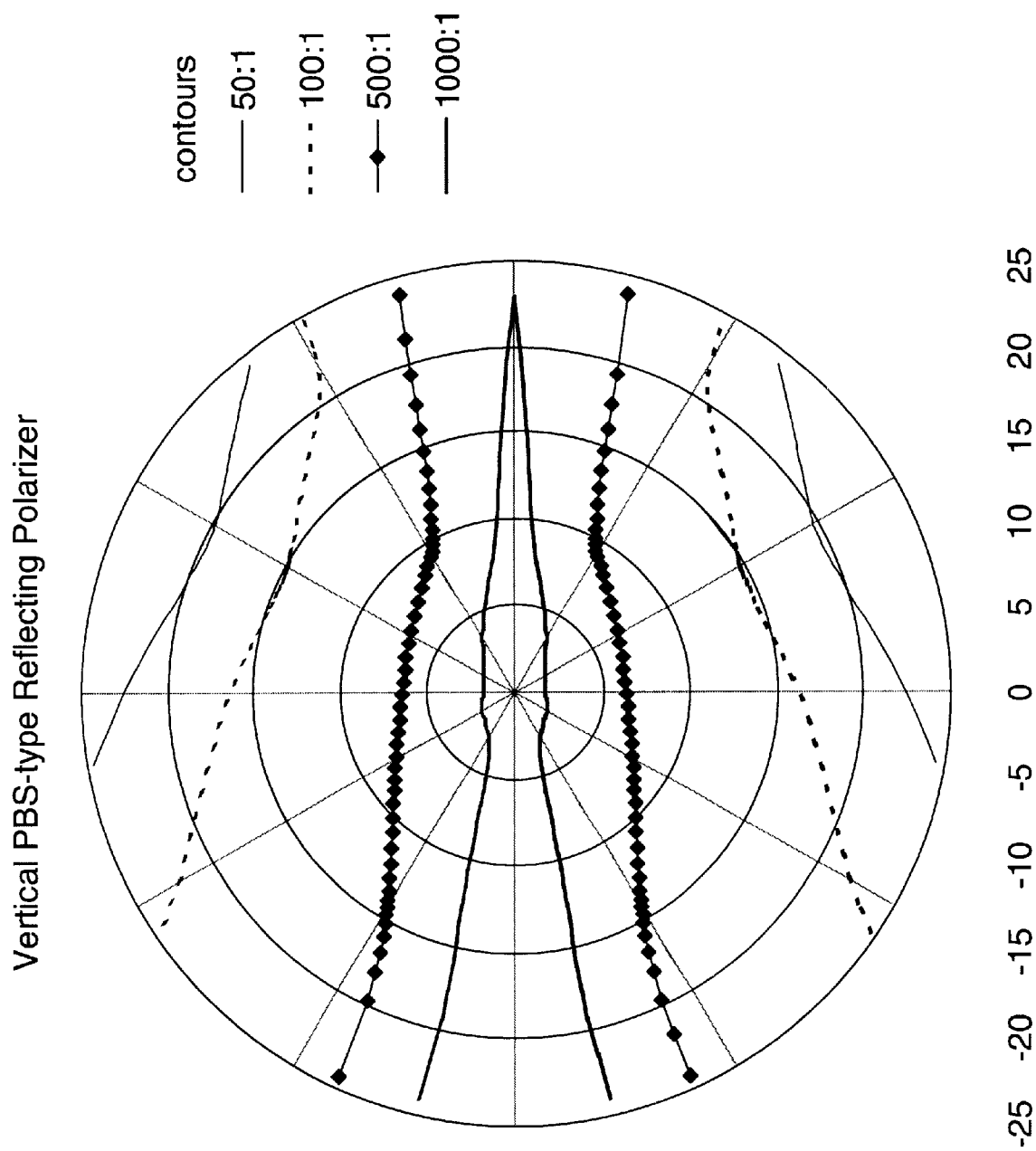
FIG. 34 is a conoscopic contrast ratio contour plot for a y-oriented linear polarizer lying in the x-y plane, followed by a biaxial multilayer polymeric reflecting polarizer with its reflection axis parallel to the y-axis and a surface normal oriented at 45° to the x-y plane, followed by an analyzing polarizer in the y-z plane. The reflecting polarizer in this example was designed to function as a Cartesian polarizing beam splitter.

FIG. 34 shows a conoscopic CR contour plot for a Y-oriented linear polarizer lying in the X-Y plane, followed by a biaxial multilayer polymeric reflecting polarizer with a reflection axis parallel to the Y-axis and a surface normal oriented at 45° to the X-Y plane. This particular reflecting polarizer was designed specifically for use as a Cartesian-type polarizing beam splitter. An analyzing polarizer (identical to the first linear polarizer) was placed in the Y-Z. The light state occurred when the analyzer was oriented to pass light polarized parallel to the Y-axis and the dark state when the analyzer oriented to block light polarized parallel to the Y-axis. The pattern of CR versus angle shown in FIG. 34 is referred to as a Maltese band and is similar to the pattern formed by non-coplanar polarizers. (In that instance as the plane of the second polarizer is rotated about the Y-axis the Maltese cross pattern is shifted along the X-axis. The Maltese band is thus revealed to be one arm of the Maltese cross.) Normal incidence occurs when $\phi=180°$ and $\theta=45°$. Along the negative ($\phi=180°$) X-axis then the rays strike the surface of the beam splitter more nearly normal. The improvement in reflection efficiency with reduced angle then causes the band to be wider along the negative X-axis.

Figure 27:
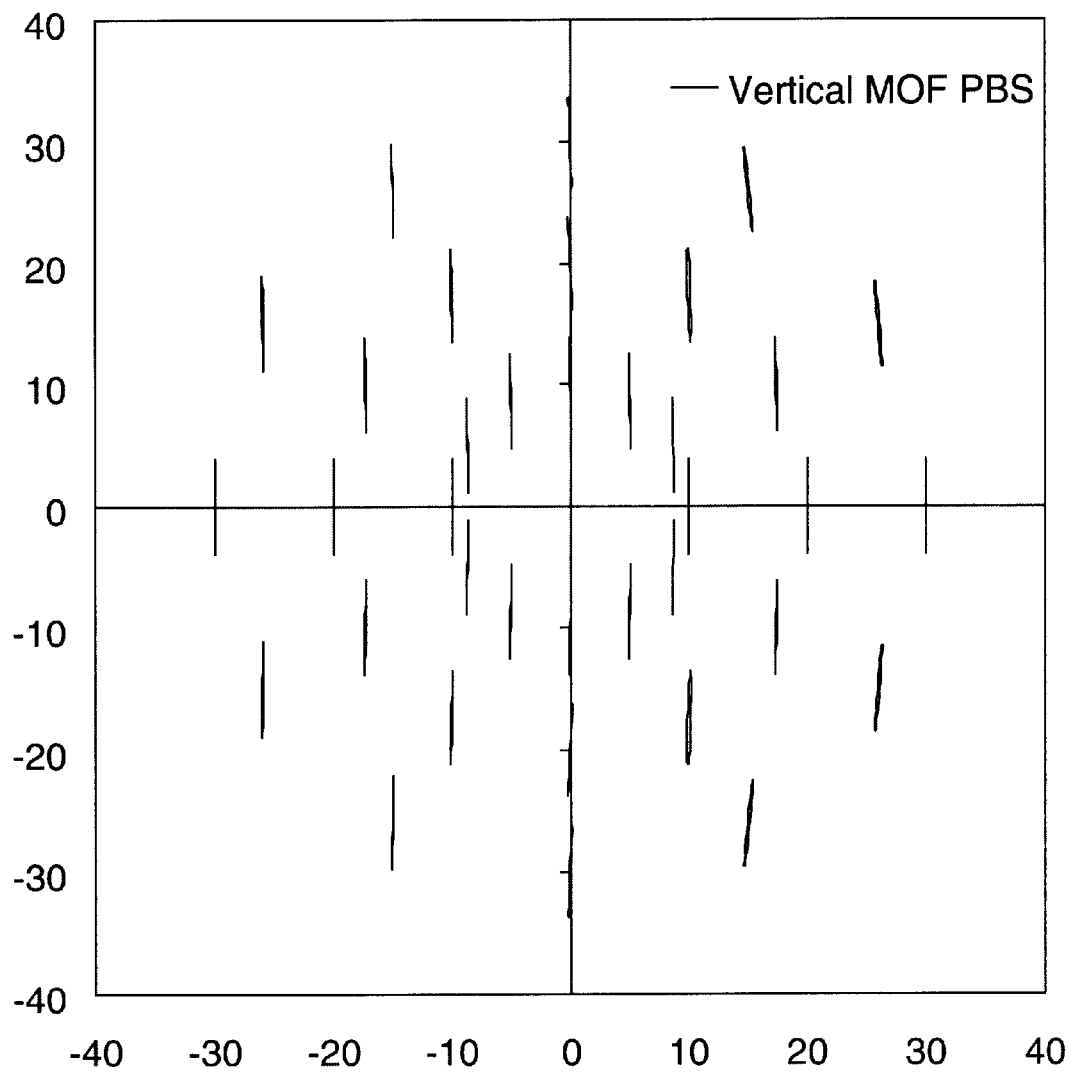
FIG. 27 is a conoscopic chart of the state of polarization of initially unpolarized light after reflection from a multi-layer polymeric reflective PBS, rotated by 45° with respect to the principal ray direction about the reflective polarizing axis (as in FIG. 2).

The highest angular CR computed for the combined polarizer plus beam splitter was much larger than for the polarizer alone, while the lowest computed CR was much smaller. There are two ways in which the reflecting polarizer acts on light from the first polarizer. The first is by a reduction in the amount of unpolarized light. A reduction in unpolarized light is a reduction in the amount of unwanted polarization. The reflecting polarizer actually increases the degree of polarization (DP) of the light over a limited range of angles. Light emerges from the first polarizer with high DP, in this case about 99.80% to 99.90%, but by cascading with the beam splitter the DP is increased to as much as 99.98%. The second way the reflecting polarizer acts on light from the first polarizer is to change the character of its polarization, to either rotate the linear polarization or to introduce ellipticity. FIG. 27 shows the computed polarization ellipses for the vertical polarized light after reflection by the PBS. A comparison with FIG. 26 reveals that while the reflecting polarizer has not added ellipticity, it has rotated the polarization. Regions with ellipses significantly rotated from vertical are seen to be the same regions with low angular CR in FIG. 34.

A way to illustrate the effect described above is the depolarization contrast ratio (DCR) vs. f/# of optical imaging systems including a traditional PBS and systems including a Cartesian PBS. FIGS. 24 and 25 are plots of these results. The depolarization contrast ratio is defined as the ratio of the transmittance of the reflected light exiting a pre-polarizer/PBS through a vertical (y) analyzer vs. a horizontal (x') analyzer. Those skilled in the art will appreciate that the wide-angle Cartesian PBS has an exceptional DCR at low f/#s as compared to the MacNeille PBS.

Angular CR is very similar to the DCR. It is a measure of the beam splitter's ability to maintain the polarization of light it reflects. DCR versus angle, however, is computed by integrating light and dark state luminosity over all $\phi$ out to some value of $\theta$ and taking their ratio and not by integrating the angular CR. The DCRs computed for the polarizer plus beam splitter in FIG. 34 are shown in FIGS. 24 and 25. As might be expected, the combined polarizer plus beam splitter has a larger DCR for large f-numbers (small angles).

Figure 28:
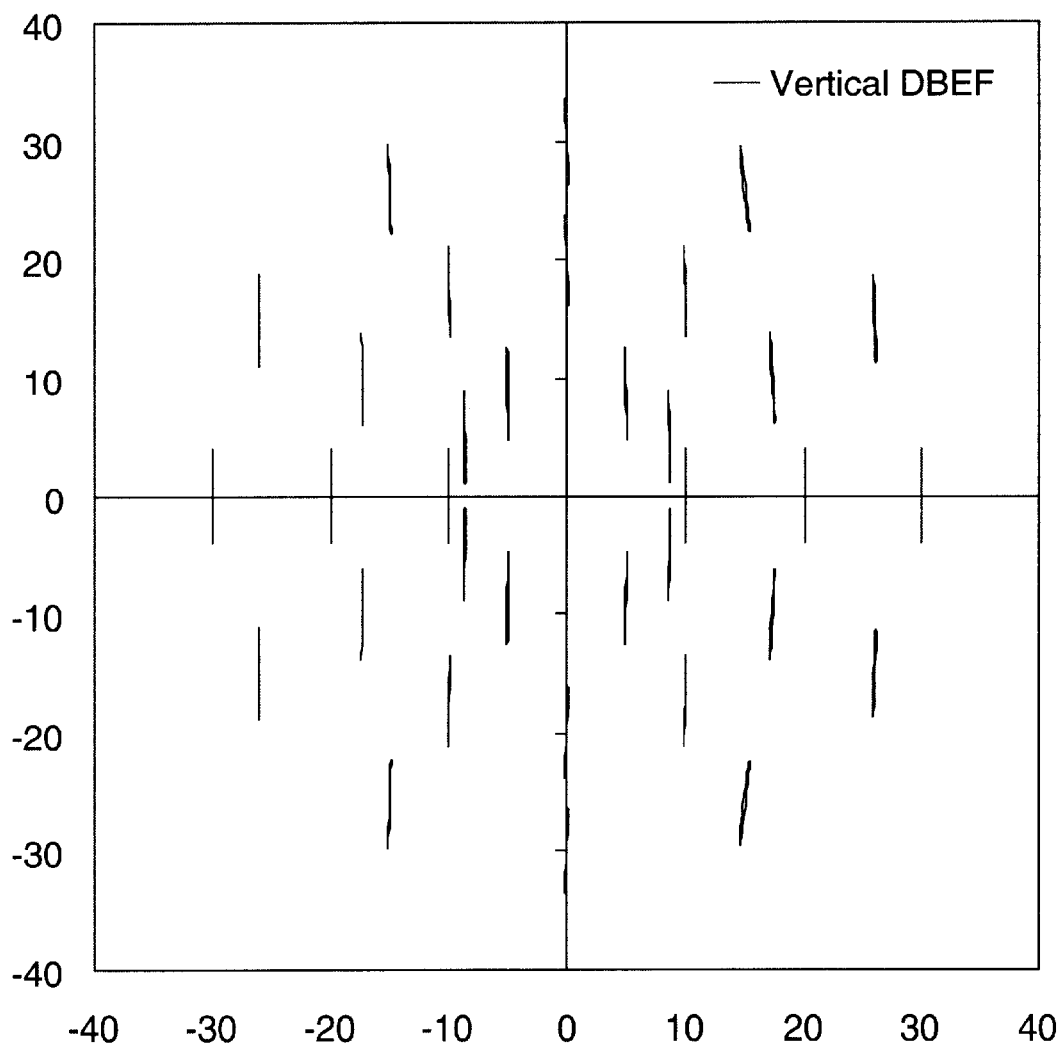
FIG. 28 is a conoscopic chart of the state of polarization of initially unpolarized light after reflection from a sheet of 3M DBEF rotated as for FIG. 27.
Figure 32:
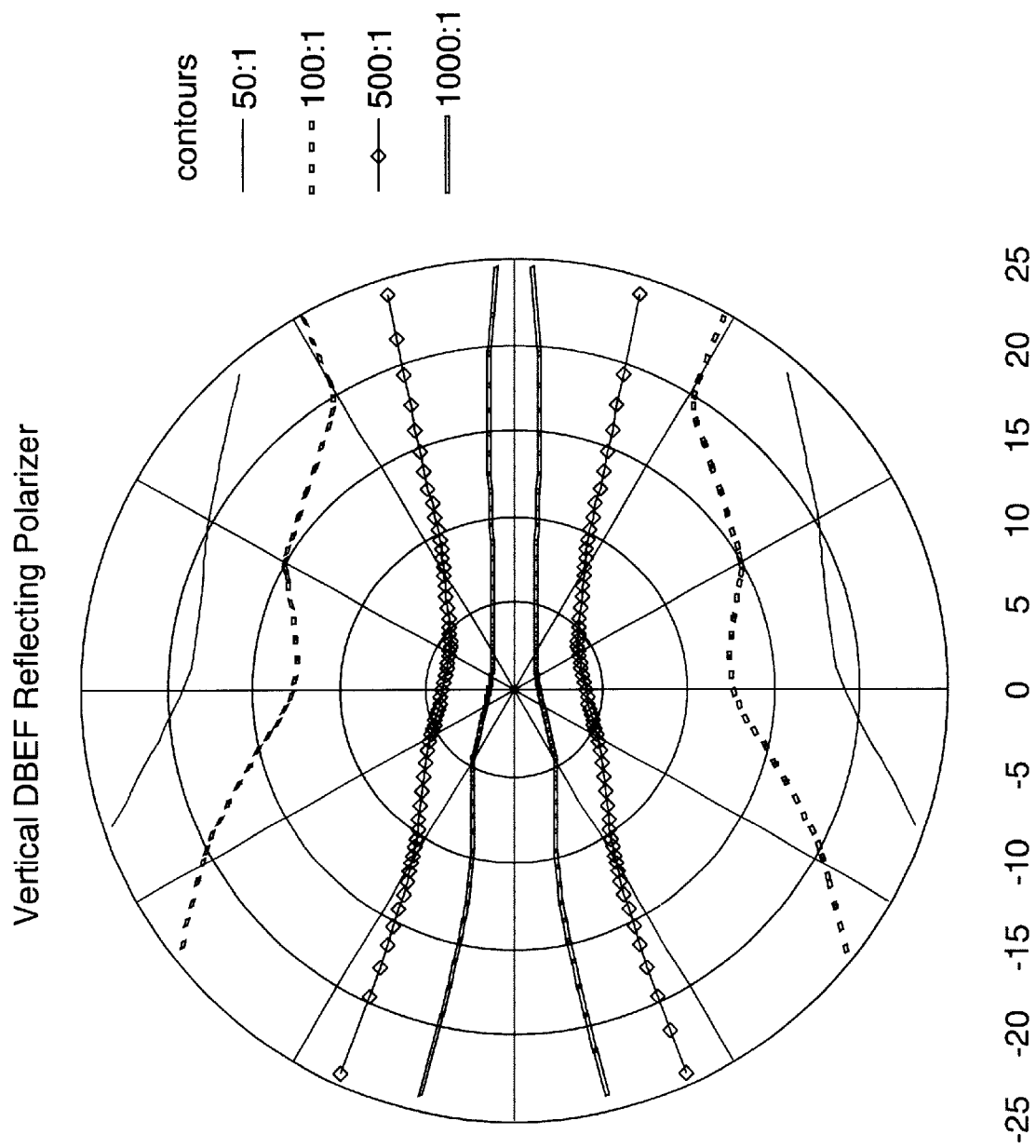
FIG. 32 is a conoscopic contrast ratio contour plot for a y-oriented linear polarizer, followed by a biaxial multilayer polymeric reflecting polarizer with reflection axis parallel to the y-axis and surface normal oriented at 45° to the x-y plane, followed by an analyzing polarizer in the y-z plane. The reflecting polarizer was designed to enhance the brightness of LCDs over a wide range of angles.

FIG. 32 also shows the computed angular CR for a Y-oriented linear polarizer lying in the X-Y plane, followed by a reflecting polarizer whose reflection axis is parallel to the Y-axis and whose surface normal is oriented at 45° to the X-Y plane. The 3M advanced film biaxial multilayer polymeric reflecting polarizer in this example was originally designed to enhance the brightness of LCDs over a wide range of angles, similar to 3M's Dual Brightness Enhancement Film (DBEF). The angular CR pattern shown in FIG. 32 has a narrower band of very high contrast compared to FIG. 34. The superiority of the optical imaging system designed to include the 3M advanced film for f-numbers less than 14 ($\theta \leq 2°$) is clearly shown in FIGS. 32 and 34. While it is not obvious by comparing the DBEF polarization ellipse plot (FIG. 28) with the beam splitter plot (FIG. 27), the beam splitter does in fact provide a more nearly vertical polarization over a larger range of angles. It also produces light with a larger DP.

Figure 33:
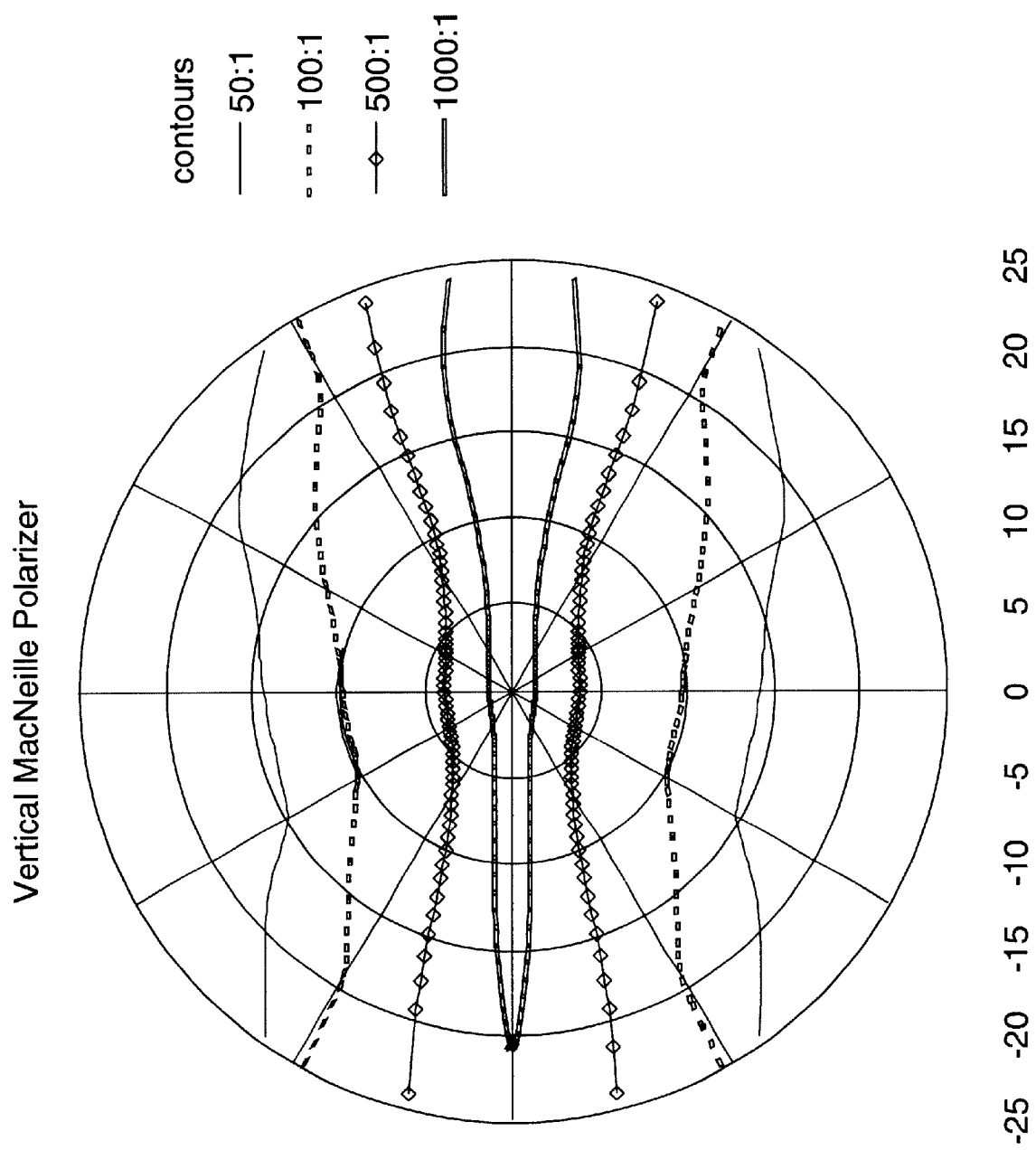
FIG. 33 is a conoscopic contrast ratio contour plot for a y-oriented linear polarizer, lying in the x-y plane, followed by a 45° MacNeille cube-type reflecting polarizer with tilt axis parallel to the y-axis, followed by an analyzing polarizer in the y-z plane.

The two reflecting polarizers just discussed are substantially Cartesian polarizers. By comparison, a MacNeille type polarizer is not. Its multi-layer optical coating is made from isotropic materials and depends upon the Brewster angle phenomena to reflect one polarization while transmitting a second. FIG. 33 shows the computed angular CR for a Y-oriented linear polarizer lying in the X-Y plane, followed by a 45° MacNeille cube-type reflecting polarizer whose axis of reflection is also parallel to the Y-axis. The CR was computed by placing an analyzing polarizer (identical to the first linear polarizer) in the Y-Z plane parallel to the cube output face. The angular CR pattern is different from those of the two Cartesian polarizers in having a reduced region of large CR that gets slightly larger along the positive X-axis. FIGS. 24 and 25 reveals this particular MacNeille polarizer to be significantly worse than either of the Cartesian polarizers at f/2 and to provide useful contrast over a much smaller range of cone angles.

Figure 29:
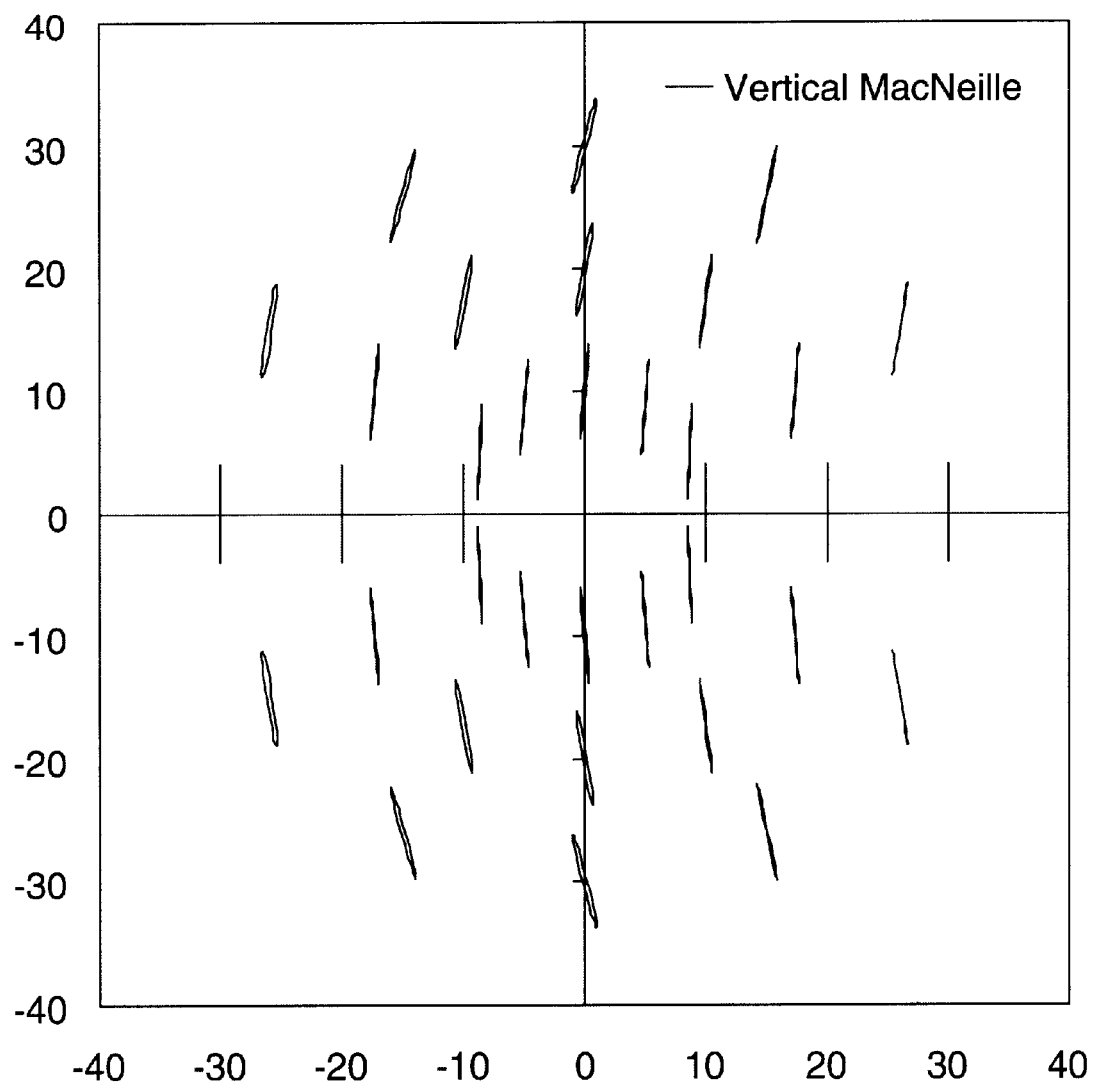
FIG. 29 is a conoscopic chart of the state of polarization of initially unpolarized light after reflection from a Mac-Neille PBS.

FIG. 29, a conoscopic plot of the polarization ellipses for the MacNeille polarizer illuminated with initially unpolarized light, also displays a very different behavior from the Cartesian polarizers. The dependence upon the Brewster phenomena is quite clear, particularly in the severe rotation of the ellipses along the $\phi=90°$ axis (oriented with the Y axis). Along the Y-axis, increasing the angle of incidence rotates the reflection plane of rays striking the 45° coating.

As the coating reflects S-polarization, the polarization of the reflected ray must rotate as well. These skew rays are the most rotated by the MacNeille polarizer with the degree of polarization rotation growing with increasing incidence angle.

Figure 30:
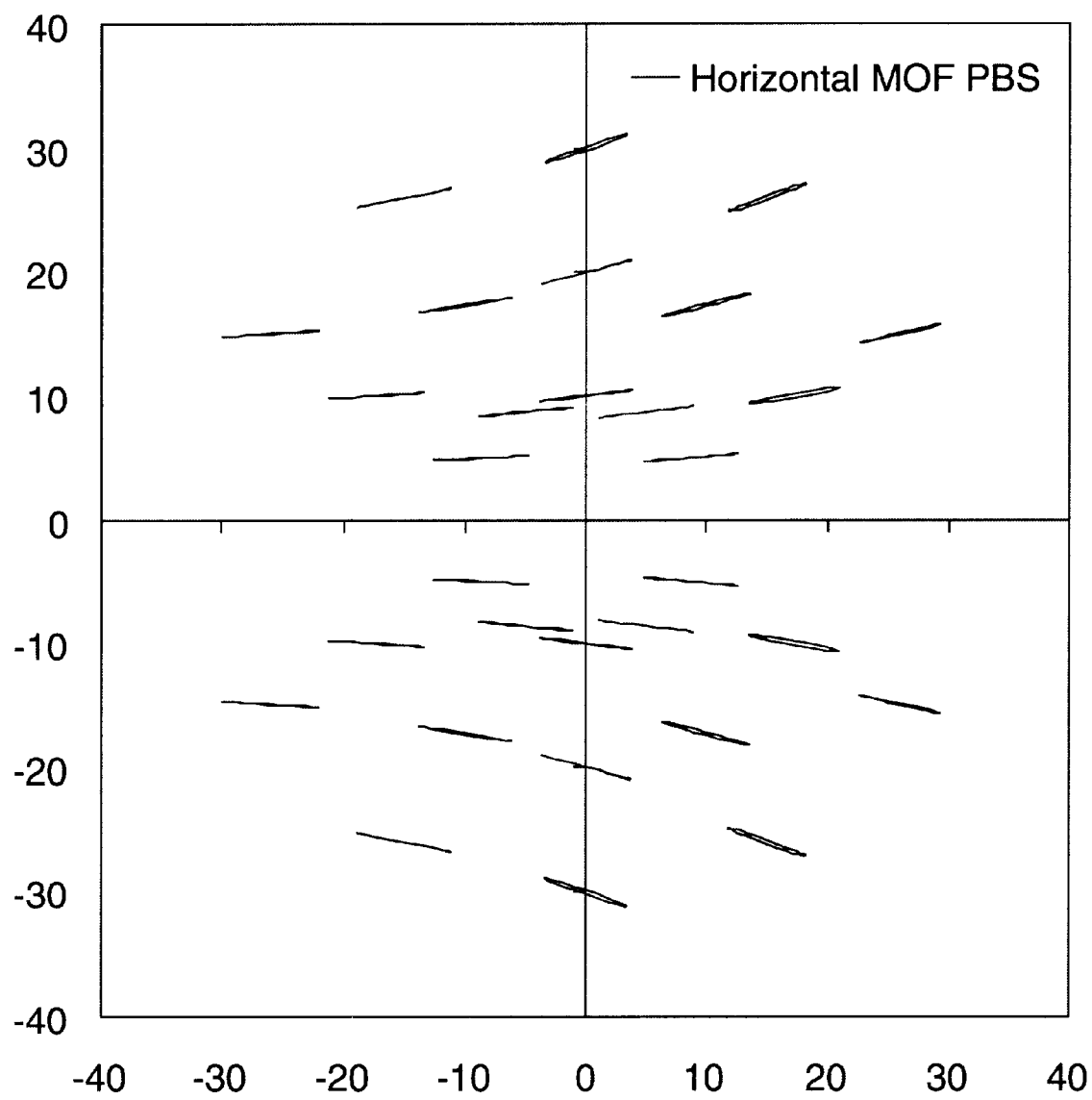
FIG. 30 is a conoscopic chart of the state of polarization of initially unpolarized light after reflection from a multi-layer polymeric reflective PBS, rotated by 45° with respect to the principal ray direction about the transmissive polarizing axis.
Figure 35:
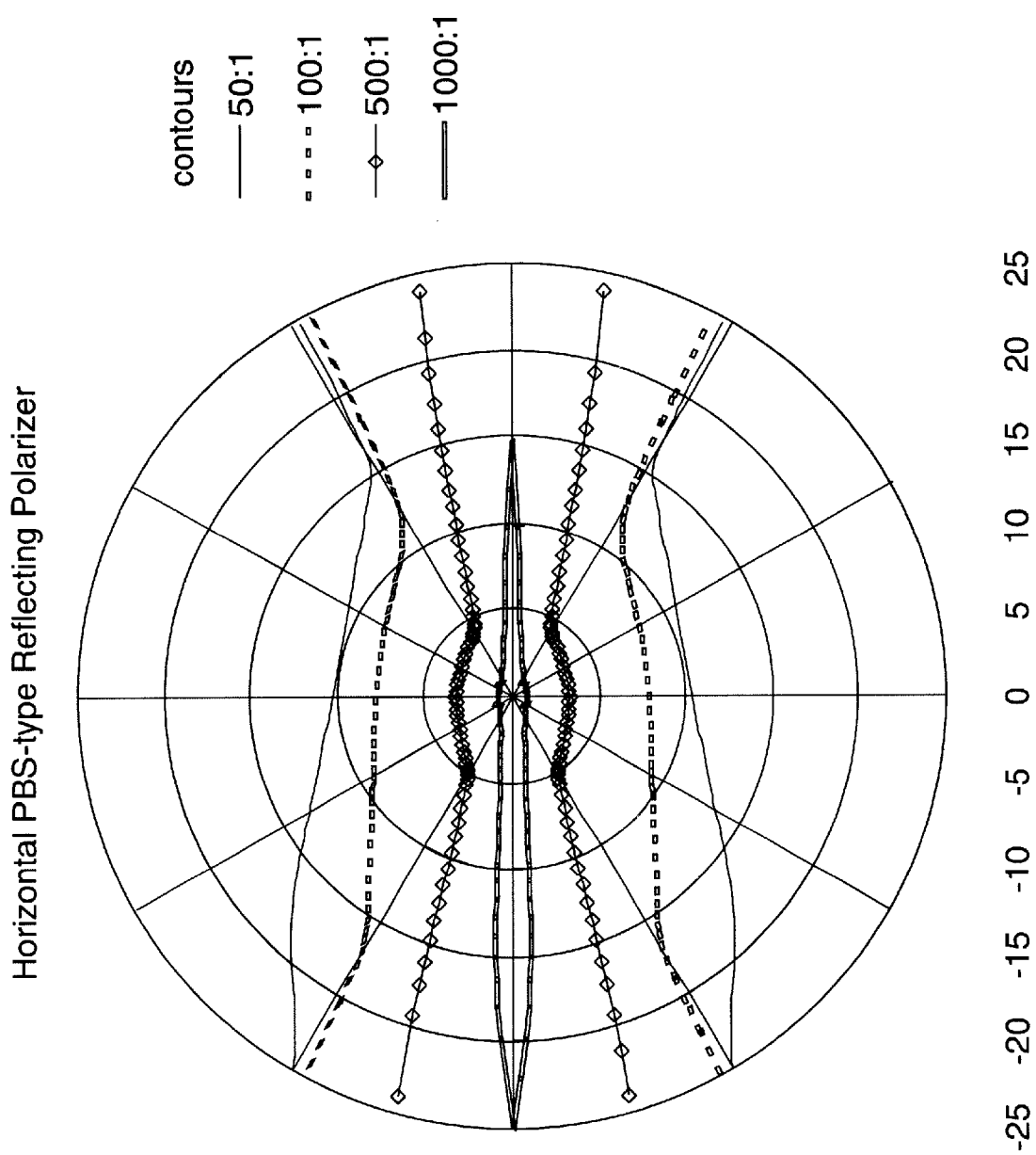
FIG. 35 is a conoscopic Contrast Ratio contour plot for an x-oriented linear polarizer lying in the x-y plane, followed by a biaxial multilayer polymeric reflecting polarizer with transmission axis parallel to the y-axis and surface normal at 45 Å to the x-y plane, followed by an analyzing polarizer in the y-z plane. The reflecting polarizer in this example was designed to function as a Cartesian polarizing beam splitter.

Note that a Cartesian polarizer may be improperly applied in a beam splitter application. To illustrate this point, the angular CR for a horizontal or X-oriented linear polarizer lying in the X-Y plane, followed by a reflecting polarizer with transmission axis parallel to the Y-axis and surface normal is at 45° to the X-Y plane, was computed. The same reflecting polarizer that was used as a PBS in the second example above, was used in this experiment, only rotated about its normal by 90° so it will reflect horizontal polarization. FIG. 35 shows the Maltese band in this case to be quite narrow with a very small region of good performance. The results were confirmed in FIG. 30 where the horizontal PBS illuminated with unpolarized light is seen to transmit light with polarization states strongly rotated away from the desired direction, the X direction in this case.

Examination of FIG. 35 reveals that the beam splitter film oriented to reflect horizontally polarized light does a poor job of maintaining the polarization despite its being a good Cartesian polarizer when oriented to reflect vertically polarized light. In the previous examples the transmission axis of the first polarizer and the reflection axis of the second were parallel and the reflection was mostly of S-polarized light. In this case the transmission axis of the first polarizer and the reflection axis of the second polarizer are merely coplanar and the reflection is predominantly of P-polarized light. Clearly the ability of this Cartesian polarizer to reflect polarized light without rotation requires a preferred orientation of its reflection axis to minimize the variations in reflection with incidence angle.

The results for the fiber illumination analysis show that a TN imager system including the MacNeille high extinction PBS cube does not provide contrast as high as that of a TN imager system including a Cartesian polarizer.

EXAMPLE 2

Performance of a Projection System Test Bed with Rantsch Illumination

Second, the systems were tested under the same parameters as in Example 1 with paired lenslet array (Rantsch) illumination, as illustrated in FIG. 4. In the Rantsch illumination case, the illumination profile was very structured due to the lenslet array integrator and the imager was more uniformly illuminated. Rantsch illumination is commonly employed in electronic projectors.

The optical imaging systems were tested using components at f/#'s between 1.8 and 8.0. The dynamic range was measured as described above.

For the case of a MacNeille cube in Rantsch illumination, the following dynamic ranges and light throughput, with and without a quarter wave compensating film, were measured. Quarter wave compensation is accomplished by placing a quarter wave compensating film (QWF) at 0° to the polarization direction of the light incident on the imagers to supply a dark state. The configuration models an FLCD imager. The mirror was used alone in the dark state to model a Nematic imager. Sufficient illumination was available in the present example to allow the results to be reported by color band.

TABLE 3

System Dynamic Range with MacNeille PBS in Rantsch Illumination

| Dark State f/# | Mirror MacNeille Green Dynamic Range | Mirror MacNeille Red Dynamic Range | Mirror MacNeille Blue Dynamic Range | Mirror with QWF MacNeille Green Dynamic Range | Mirror with QWF MacNeille Red Dynamic Range | Mirror with QWF MacNeille Blue Dynamic Range |
|---|---|---|---|---|---|---|
| 1.8 | 31:1 | 31:1 | 29:1 | 93:1 | 91:1 | 63:1 |
| 2.0 | 33:1 | 34:1 | 30:1 | 94:1 | 93:1 | 65:1 |
| 2.4 | 38:1 | 39:1 | 36:1 | 101:1 | 101:1 | 73:1 |
| 2.8 | 42:1 | 45:1 | 40:1 | 147:1 | 140:1 | 94:1 |
| 3.3 | 67:1 | 77:1 | 61:1 | 271:1 | 298:1 | 136:1 |
| 4.0 | 88:1 | 104:1 | 81:1 | 336:1 | 368:1 | 167:1 |
| 4.7 | 157:1 | 166:1 | 129:1 | 519:1 | 452:1 | 258:1 |
| 5.6 | 405:1 | 333:1 | 241:1 | 826:1 | 599:1 | 378:1 |
| 6.7 | 509:1 | 442:1 | 300:1 | 1019:1 | 694:1 | 420:1 |
| 8.0 | 577:1 | 496:1 | 287:1 | 1129:1 | 662:1 | 430:1 |

TABLE 4

System Throughput with MacNeille PBS in Rantsch Illumination

| f/# | MacNeille Green Flux (lm) | MacNeille Red Flux (lm) | MacNeille Blue Flux (lm) |
|---|---|---|---|
| 1.8 | 1110.0 | 163.0 | 74.0 |
| 2.0 | 1070.0 | 158.0 | 70.9 |
| 2.4 | 990.0 | 145.0 | 65.7 |
| 2.8 | 959.0 | 140.0 | 62.9 |
| 3.3 | 852.0 | 125.0 | 55.9 |
| 4.0 | 685.0 | 103.0 | 45.1 |
| 4.7 | 545.0 | 81.4 | 36.1 |
| 5.6 | 413.0 | 59.9 | 26.5 |
| 6.7 | 326.0 | 48.6 | 21.0 |
| 8.0 | 271.0 | 39.7 | 17.2 |

Measurements taken with wide-angle Cartesian PBS provided the following results:

TABLE 5

System Dynamic Range with wide-angle Cartesian PBS in Räntsch Illumination

| Dark State f/# | Mirror Wide-angle Cartesian Green Dynamic Range | Mirror Wide-angle Cartesian Red Dynamic Range | Mirror Wide-angle Cartesian Blue Dynamic Range | Mirror with QWF Wide-angle Cartesian Green Dynamic Range | Mirror with QWF Wide-angle Cartesian Red Dynamic Range | Mirror with QWF Wide-angle Cartesian Blue Dynamic Range |
|---|---|---|---|---|---|---|
| 1.8 | 206:1 | 205:1 | 124:1 | 280:1 | 245:1 | 175:1 |
| 2.0 | 214:1 | 215:1 | 130:1 | 302:1 | 277:1 | 190:1 |
| 2.4 | 230:1 | 212:1 | 132:1 | 304:1 | 300:1 | 199:1 |
| 2.8 | 268:1 | 283:1 | 157:1 | 347:1 | 324:1 | 226:1 |
| 3.3 | 344:1 | 345:1 | 161:1 | 460:1 | 407:1 | 259:1 |
| 4.0 | 405:1 | 378:1 | 165:1 | 653:1 | 567:1 | 271:1 |
| 4.7 | 469:1 | 432:1 | 191:1 | 831:1 | 692:1 | 324:1 |
| 5.6 | 457:1 | 450:1 | 172:1 | 938:1 | 707:1 | 343:1 |
| 6.7 | 538:1 | 466:1 | 221:1 | 1018:1 | 746:1 | 310:1 |
| 8.0 | 614:1 | 662:1 | 216:1 | 1005:1 | 827:1 | 360:1 |

TABLE 6

System throughput with wide-angle Cartesian PBS in Räntsch Illumination

| f/# | Wide-angle Cartesian Green Flux (lm) | Wide-angle Cartesian Red Flux (lm) | Wide-angle Cartesian Blue Flux (lm) |
|---|---|---|---|
| 1.8 | 1219.0 | 173.8 | 77.7 |
| 2.0 | 1166.0 | 164.3 | 74.5 |
| 2.4 | 1060.0 | 146.3 | 67.4 |
| 2.8 | 978.4 | 141.0 | 59.9 |
| 3.3 | 853.3 | 120.8 | 49.4 |
| 4.0 | 699.6 | 96.1 | 40.2 |
| 4.7 | 537.4 | 73.3 | 34.3 |
| 5.6 | 367.8 | 52.5 | 21.8 |
| 6.7 | 302.1 | 39.5 | 16.4 |
| 8.0 | 234.2 | 35.1 | 11.4 |

Example 2 more closely resembles the arrangement of an actual projection system. In this Example, the contrast performance of the MacNeille cube is much less than that of the wide-angle Cartesian PBS; the difference being much greater than that seen with fiber illumination.

Summary of Results

Reflective nematic LCD based electronic projection system including 3M advanced film Cartesian PBS's were observed to have a number of advantages over systems including MacNeille Polarizer PBS's. These include:
1. Cartesian PBS systems provide higher contrast than a MacNeille PBS system, especially for low f/#'s, for all illumination profiles explored.
2. Cartesian PBS systems provide higher contrast than similar MacNeille PBS systems for all color bands measured. It is expected that the higher contrast also would be present in systems including Kohler and critical illumination. Such high contrast allows the designer of the illumination system to optimize the illumination uniformity and throughput with fewer constraints being imposed by contrast considerations for the PBS.

According to the theoretical considerations that underpin this work, the general results achieved for the tested Cartesian PBS may be applicable to any wide-angle Cartesian PBS. Alternative embodiments may include other suitable Cartesian PBS's, such as wire grid polarizers.

While not wishing to be bound by theory, acceptable contrast at angles deviating appreciably from normal incidence has been found to be easier to achieve for FLCD imagers than is the case for Twisted Nematic (TN) imagers. Accordingly, FLCD imagers offer superior contrast relative to TN imagers at very small f/#'s, thereby improving the potential efficiency of light utilization for FLCD relative to TN imagers when used in conjunction with a wide angle PBS. The combination of wide-angle Cartesian PBS's and FLCD imagers allows for faster optical beams to be employed in, for example, sequential color systems where the color separating prism does not limit the f/#. In this sort of system, or any other which allows f/#'s below 2 to be used, the contrast advantage of the FLCD with fast optical beams allows a more efficient light throughput.

Those skilled in the art will appreciate that the present invention may be used when designing optical projection systems or other imaging systems that use polarized light. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. An optical imaging system comprising:
   a) a wide-angle Cartesian polarizing beam splitter, the polarizing beam splitter having a structural orientation defining fixed axes of polarization;
   b) at least one reflective light valve, wherein the polarizing beam splitter splits incident light into a first and a second substantially polarized beam having polarization states referenced to the fixed coordinate system and wherein the polarizing beam splitter directs the first polarized beam onto the reflective light valve; and
   c) light valve illumination optics illuminating the at least one reflective light valve via the polarizing beam splitter with light having an f/# equal to or less than 2.5 and wherein the optical imaging system has a dynamic range of at least 100 to 1 over projected color bands in the visible light range.

2. The optical imaging system of claim 1, wherein the system has a minimum acceptance cone angle of about 12 degrees.

3. The optical imaging system of claim 1, wherein the dynamic range exceeds 150 to 1.

4. The optical imaging system of claim 1, the light valve illumination optics having an f/# of at most 2.0.

5. The optical imaging system of claim 4, wherein the dynamic range exceeds 150 to 1.

6. The optical imaging system of claim 1, wherein the light valve is a polarization modulating light valve.

7. The optical imaging system of claim 1, wherein the reflective light valve is a smectic liquid crystal light valve.

8. The optical imaging system of claim 7, wherein the reflective light valve is an FLCD.

9. The optical imaging system of claim 1, wherein the reflective light valve is a nematic liquid crystal light valve.

10. The optical imaging system of claim 1, further comprising a quarter-wave compensator located optically between the Cartesian polarizing beam splitter and the reflective light valve.

11. The optical imaging system of claim 1, further comprising a pre-polarizer, wherein the pre-polarizer polarizes input light into pre-polarized light, wherein the pre-polarized light comprises the incident light on the polarizing beam splitter.

12. The optical imaging system of claim 1, further comprising a color separation and recombination prism and a plurality of reflective light valves, wherein the prism receives the polarized light from the polarizing beam splitter, color separates the polarized light and directs polarized color beams to each light valve.

13. The optical imaging system of claim 1, wherein the reflective light valve reflects at least a portion of the first polarized beam back to the Cartesian polarizing beam splitter.

14. The optical imaging system of claim 1, wherein the first polarized beam has a principal ray and the light valve has reflective surface defining a reflective plane, wherein the principal ray is normal to the reflective plane.

15. The optical imaging system of claim 1, further comprising a second Cartesian polarizing beam splitter, wherein the reflective light valve reflects at least a portion of the first polarized beam to the second beam splitter.

16. The optical imaging system of claim 1, wherein the Cartesian polarizing beam splitter comprises a multi-layer birefringent film.

17. The optical imaging system of claim 1, wherein the polarizing beam splitter comprises a multi-layer polymeric film.

18. The optical imaging system of claim 1, wherein the polarizing beam splitter comprises a wire grid polarizer.

19. The optical imaging of claim 1, the illumination optics having an f/# equal or less than 1.8.

20. The optical imaging system of claim 1, the Cartesian polarizing beam splitter having a rotation axis and a Material Axis along which light reflected by the Cartesian polarizing beam splitter is substantially polarized, wherein the rotation axis is oriented parallel to the Material Axis.

21. The optical imaging system of claim 1, wherein the Cartesian polarizing beam splitter is curved along at least one axis.

22. The optical imaging system of claim 1, wherein the principal ray of the incident light is incident on the Cartesian polarizing beam splitter at an angle between 40° and 50°.

23. An optical imaging system as recited in claim 1, wherein the wide angle, Cartesian polarizing beamsplitter maintains the dynamic range of at least 100 to 1 in each projected color band for a cone of incident light defining the f/# of 2.5 or less.

24. An optical system comprising:
    at least one reflective light valve for reflecting a two dimensional image;
    light valve illumination optics producing an illuminating beam of light incident on the at least one reflective light valve with an f/# of no more than 2.5; and
    a wide angle, Cartesian polarizing beamsplitter disposed between the at least one light valve and the light valve illumination optics so that the illuminating beam passes to the at least one light valve via the wide angle Cartesian polarizing beamsplitter in a first polarization state;
    wherein image light modulated by the at least one light valve is passed via the wide angle Cartesian polarizing beamsplitter in a second polarization state orthogonal to the first polarization state, and has a dynamic range of at least 100:1 in each projected color band.

25. An optical system as recited in claim 24, wherein the wide angle, Cartesian polarizing beamsplitter reflects light in a cone having the f/# of no more than 2.5 while maintaining the dynamic range of at least 100:1 in each projected color band.

* * * * *

UNITED STATES PATENT AND TRADEMARK OFFICE
CERTIFICATE OF CORRECTION

PATENT NO. : 6,486,997 B1   Page 1 of 1
DATED : November 26, 2002
INVENTOR(S) : Bruzzone, Charles L.

It is certified that error appears in the above-identified patent and that said Letters Patent is hereby corrected as shown below:

Column 2,
Line 15, "illuminate n optical element" should read -- illuminate an optical element --

Column 3,
Line 12, "of the principal ray" should read -- of the principal ray, also known as the central ray --.
Line 32, "the use of a such a film" should read -- the use of such a film --

Column 6,
Line 50, "and high speed illumination" should read -- and fast illumination --

Column 8,
Line 26, "the moor optic axes," should read -- the major optic axes, --

Column 22,
Line 35, "than $14(\theta \leq 2°)$" should read -- than about $14(\theta \leq 2°)$ --

Column 26,
Line 28, "Cartesian PB S's" should read -- Cartesian PBS's --

Signed and Sealed this

Twenty-ninth Day of July, 2003

JAMES E. ROGAN
*Director of the United States Patent and Trademark Office*